United States Patent [19]
Ravas

[11] 3,903,469
[45] Sept. 2, 1975

[54] INVERTING ARRANGEMENT EMPLOYING COMPRESSED SINE WAVES AND CLASS B AMPLIFIERS

[75] Inventor: Richard J. Ravas, Monroeville, Pa.

[73] Assignee: Westinghouse Electric Corporation, Pittsburgh, Pa.

[22] Filed: Sept. 27, 1973

[21] Appl. No.: 401,521

[52] U.S. Cl. ............................ 321/9 R; 321/DIG. 1
[51] Int. Cl.² ......................................... H02M 1/12
[58] Field of Search .................. 321/5, 9 R, DIG. 1; 318/227; 333/76, 77

[56] References Cited
UNITED STATES PATENTS

| | | | |
|---|---|---|---|
| 2,239,437 | 4/1941 | Bedford | 321/DIG. 1 |
| 3,060,363 | 10/1962 | Jensen | 321/DIG. 1 |
| 3,430,073 | 2/1969 | Leonard | 321/DIG. 1 |
| 3,539,902 | 11/1970 | Hickling | 321/9 R |
| 3,648,149 | 3/1972 | Brown et al. | 321/9 A |
| 3,767,988 | 10/1973 | Jensen | 321/9 A |
| 3,824,442 | 7/1974 | King | 321/5 |
| 3,839,667 | 10/1974 | King | 321/9 R |

*Primary Examiner*—William H. Beha, Jr.
*Attorney, Agent, or Firm*—C. M. Lorin

[57] ABSTRACT

An inverter utilizes class B amplifiers to amplify a compressed sine wave signal. Increased efficiency of the inverter may be achieved by utilizing supplemental paths in the amplifier, to carry the load current with less dissipation, for at least a portion of the signal cycle. In addition, a filtering arrangement, including a transformer having a three leg core, may be utilized to provide a sine wave voltage between the output lines and a neutral point, as well as from line to line.

8 Claims, 12 Drawing Figures

CONVENTIONAL CLASS B

SINGLE STEP

SIMPLIFIED DOUBLE STEP

DOUBLE STEP

//3,903,469

INVERTING ARRANGEMENT EMPLOYING COMPRESSED SINE WAVES AND CLASS B AMPLIFIERS

BACKGROUND OF THE INVENTION

1. Field of the Invention

This invention relates primarily to an amplifying arrangement utilized in an inverting arrangement, and more particularly, this invention relates to an inverting arrangement utilizing modified class B amplifiers and a signal filtering and reconstruction system.

2. Description of the Prior Art

There is a continual employment of power conditioning systems to convert available direct current (DC) sources to sine wave alternating current (AC) sources, such as in aerospace and military applications. The techniques used have evolved from motor-generator sets, to filtered square wave inverters, to harmonic neutralized inverters, to pulse width modulated inverters. This evolution gradually improved the reliability, reduced the size and weight, and increased the efficiency of the power conditioning systems.

Recently, the trend has been toward high frequency chopping techniques, such as pulse width modulation, to achieve light weight and high efficiency, but experience has shown that such high frequency power conditioning frequently does not produce the benefits that are anticipated. As an example, the generated radio frequency interference (RFI or hash) frequently requires the addition of shielding and filter components, which negate the savings that would otherwise be obtained in size weight. Moreover, the available transformer magnetic materials, when operated in the range of 5 kHz to 30 kHz, do not yield the normally expected weight versus frequency improvements because their magnetic losses essentially limit the flux rate of change of the material.

The problems encountered in utilizing high frequency power conditioning have led to a reconsideration of fundamental frequency power conditioning. To be effective, such an approach would have to involve some technique for avoiding fundamental frequency filters. Thus, the use of class B amplifiers is often considered, but this approach is not carried through, due to the theoretical maximum efficiency of only 78.5% that can be achieved with class B amplifiers. The 78.5% efficiency sometimes could be tolerated, in view of the benefits to be gained by utilization of the class B technique, but a practical circuit which would yield no more than 65% efficiency renders this approach unsuitable.

A recent development, involving the concept of compressed sine wave inversion, has provided a means to achieve theoretical efficiencies of 90.7% with relatively simple circuitry. This concept has been implemented in the form of three conventional class B amplifiers driving a balanced three phase load. The increased efficiency is achieved by suitably distorting or compressing the sine wave signal being fed into the class B amplifier. The compressed sine wave has the peaks of both the positive and negative half cycles flattened, so that the current which flows through the amplifier transistors at these times is essentially flowing through saturated transistors. As a result, the amplifier losses due to this current flow are held to a minimum. In the case of a purely resistive load (unity power factor), the current peaks occur during the flattened portions of the voltage waveform, and this results in a more efficient transfer of power than if the amplifiers were amplifying pure sine wave voltages. The voltage waveform is synthesized in such a form that if one observes the line to line voltages of any two phases (equivalent to the algebraic difference of the two compressed waveforms), a perfect sinusoid is formed.

Although this concept represents a considerable advance in the state of the art in power conditioning, it does have some drawbacks. The high efficiency which is possible can only be achieved for a purely resistive load, and the efficiency deteriorates rapidly as the load becomes more reactive. Since performance deteriorates with reactive loading, the system is dependent on a balanced three phase resistive load to maintain the necessary unity power factor load across each amplifier phase. In addition, there is no inherent neutral point, so that a four wire, three phase system cannot be provided.

SUMMARY OF THE INVENTION

Briefly, the present invention relates to an improved inverting arrangement that obviates the disadvantages encountered in previous inverting arrangements that utilize compressed sine waves in class B amplifiers. This is achieved by providing low dissipation current paths for selected portions of the load current cycle and, in the case of a three phase system, providing sine wave load voltages between the output lines and a neutral point, as well as from line to line.

The inverting arrangement has connected thereto a source of direct current supply potential which is to be converted into an alternating current. A low level generating system initially converts the DC supply potential into a three phase alternating sine wave signal which is then processed to achieve a three phase compressed sine wave with both the positive and negative peaks thereof flattened. This flattened or compressed sine wave is then conveyed to an amplifying arrangement including a class B amplifier. The class B amplifier has a first supply voltage, such as the supply potential of the DC source, applied thereto. In order to provide less dissipative load current flow, a second class B amplifier is connected to supply load current during selected portions of the cycle. A second supply voltage, such as the reference or ground side of the DC source, is applied to this second class B amplifier. Appropriate control circuitry, such as switching devices and associated switch actuating arrangements, are utilized to cause the first class B amplifier to carry load current only when the second class B amplifier is saturated (i.e., its voltage limits are exceeded). As many additional class B amplifiers as required for a given situation may be added in the same fashion. However, in the preferred embodiment disclosed herein, a third class B amplifier has been utilized. A supply voltage having a magnitude falling between the magnitudes of the first and second supply voltages, such as one-half the supply potential, is connected to the third class B amplifier. The control circuitry assures that the third class B amplifier will conduct load current only when the second class B amplifier is saturated and that the first class B amplifier will carry load current only when the third class B amplifier is saturated.

When a three phase output is desired, each of the phase voltages will be a compressed sine wave, and each compressed sine wave will be conveyed to an amplifying arrangement such as that described above. The outputs of these amplifying arrangements could be combined to provide line to line AC voltages that have the desired sine wave shape, but no line to neutral voltages would be provided. Any attempt to easily obtain such line to neutral voltage (in order to feed unbalanced or single phase loads) would be unsuccessful, since the line to neutral voltage would appear as a compressed sine wave, rather than the desired actual sine wave. Since it may be shown that the compressed sine wave consists primarily of the fundamental and third harmonic of the desired sine wave, the desired line to neutral sine waves may be obtained by utilizing a filter having a series band stop element, such as a parallel resonant element, which stops the third harmonic from reaching the output, and a parallel third harmonic shunt, which prevents any third harmonic voltage from appearing across the load. A three phase transformer having a three leg core provides an excellent third harmonic shunt, as a result of the inability of such a transformer to sustain third harmonic flux variations. If a transformer should not be needed in the inverter, a much smaller three leg core having only three primary windings can be utilized to provide the third harmonic shunt. (In the event that it is desired to operate a single phase system, a third harmonic series tuned trap may be utilized to provide the third harmonic shunt.)

A major advantage of the compressed sine wave inverter is that it achieves high efficiency without employing high frequency chopping techniques. Thus, a hash-free, small and lightweight inverting arrangement that utilizes stable and robust low-frequency power transistors is produced. In addition, the acoustical noise that is frequently encountered in such systems is also reduced. Further, this arrangement increases the efficiency of prior art systems utilizing compressed sine waves and class B amplifiers, in addition to providing a neutral or four-wire wye arrangement found in prior art systems. This, of course, means that the present inverting arrangement can handle reactive loads much more efficiently, as well as being able to supply unbalanced and single phase loads.

The foregoing and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 1:
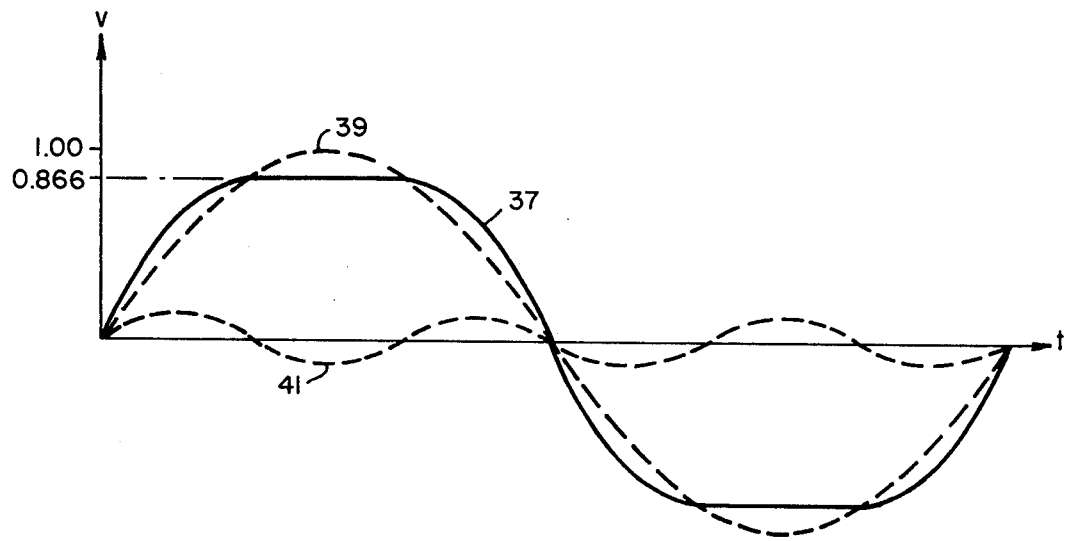
FIG. 1 is a schematic diagram illustrating a compressed sine wave, and its major components, utilized in connection with the present invention.

A compressed sine wave of the type utilized in this invention to achieve inversion of a DC signal to an AC signal is shown as curve 37 in FIG. 1. The compressed sine wave 37 has the peaks on both the positive half cycle and negative half cycle flattened. By a Fourier analysis of the waveform, it has been determined that the compressed sine wave 37 may be described to about 1% accuracy by a fundamental frequency wave 39 and approximately 13% of a third harmonic wave 41. The phase of the third harmonic 41 is adjusted to cancel the peaks of the fundamental 39. It may be noted that if the peak potential of fundamental wave 39 is described as a unit, the peak magnitude of the compressed sine wave 37 will be 0.866.

Figure 2:
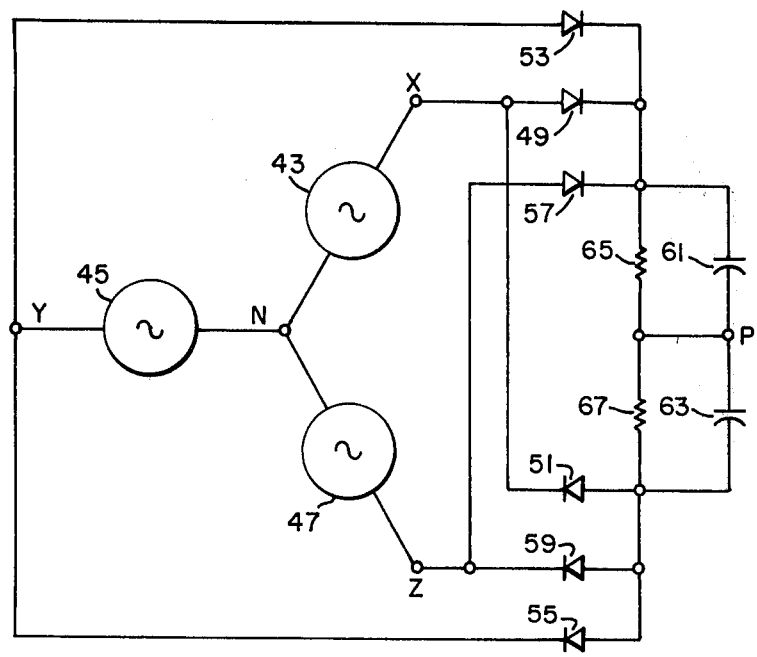
FIG. 2 is a circuit diagram schematically illustrating a generating arrangement utilized to synthesize the compressed sine wave of FIG. 1.
Figure 3A:
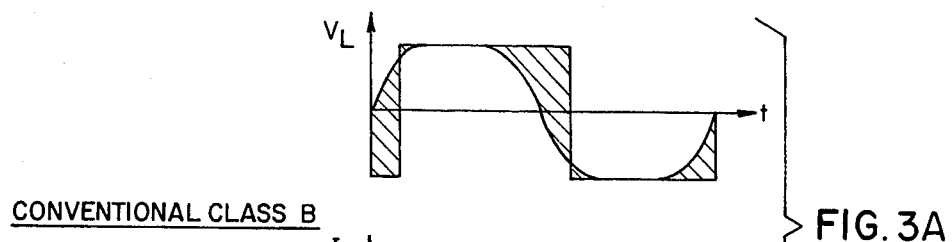
FIG. 3 is a series of schematic diagrams illustrating the effects of a reactive load on a conventional class B amplifier fed with the compressed sine wave of FIG. 1, together with the effects on three modifications of the amplifier.
Figure 3B:
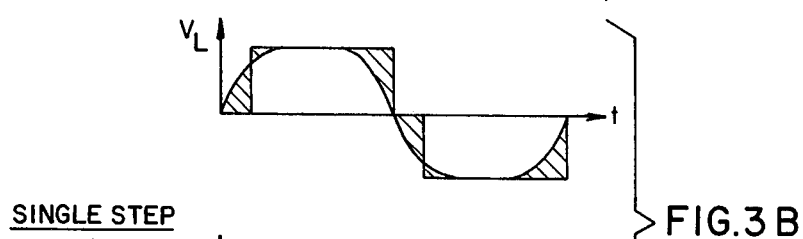
Figure 3C:
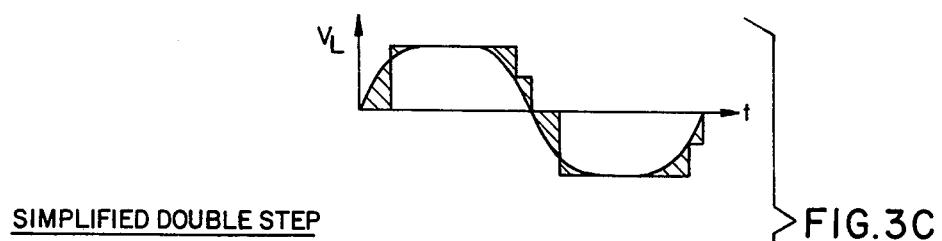
Figure 3D:
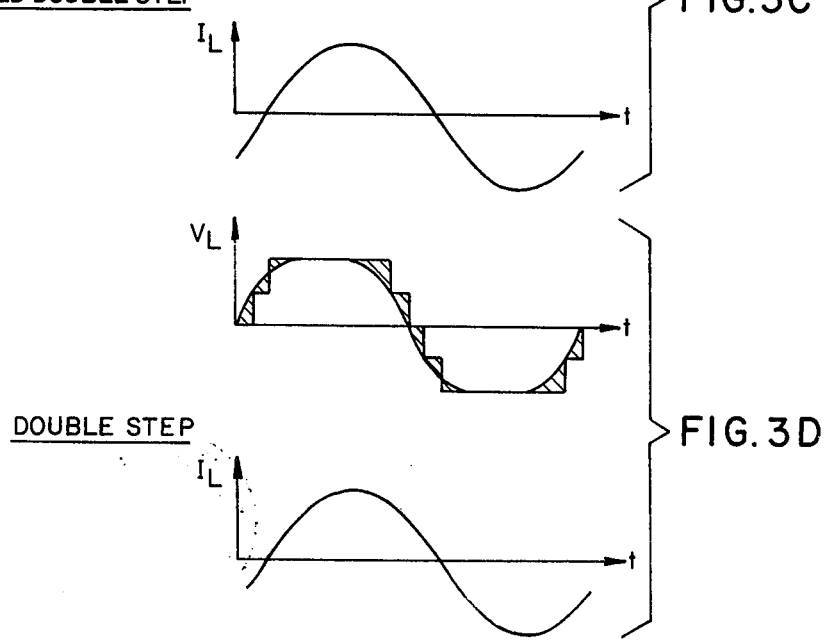

Construction of the compressed sine wave 37 may be achieved in any desired fashion, but a simplified version of one sine wave generating structure is illustrated in FIG. 2. In this arrangement, the three phases of a three phase sine wave source operating at the fundamental frequency are shown as sine wave generators 43, 45 and 47. The output of sine wave generator 43 is full wave rectified by diodes 49 and 51, the output of sine wave generator 45 is full wave rectified by diodes 53 and 55, and the output of sine wave generator 47 is full wave rectified by diodes 57 and 59. The rectified signals from the sine wave generators 43, 45 and 47 are then conveyed to a capacitive load having capacitors 61 and 63. Capacitor 61 is shunted by a resistor 65, while capacitor 63 is shunted by a resistor 67. Resistors 65 and 67 have a very high resistance and serve to extinguish the effects of any initial starting transients. With this arrangement, the voltage from point X to point P is one phase having a compressed waveform. Each of the other phases (from point Y to point P and from point Z to point P) also have a compressed sine wave shape. In order to illustrate that the waveforms X-P, Y-P and Z-P have the proper shape, the X-P voltage may be subtracted from the Y-P voltage to produce the sinusoidal voltage from Y to X.

The four diagrams in FIG. 3 illustrate the voltage conditions that result in a class B amplifier, and three modifications thereof, when supplying a slightly lagging reactive load. The cross hatched areas represent the internal drops within the amplifier through which the load current flows. Diagram 3A shows these conditions for a conventional class B amplifier. As may be seen in this diagram, there are extensive areas of internal voltage drops, especially during the times that the load voltage has a different polarity than the load current as a result of the reactive load. These relatively large internal voltage drops represent the high reactive losses that occur when a conventional class B amplifier is supplying a reactive load.

To reduce the reactive losses, and hence increase the efficiency of the amplifier, it is possible to subdivide the internal voltage drops into a number of smaller steps, and thus reduce the internal losses. Diagrams 3B, 3C and 3D illustrate various modifications of this nature. Diagram 3B relates to a single step arrangement in which the load current flows not just from the positive and negative sides of the DC source, as in the case of the conventional class B amplifier, but also from the zero volts level. Thus, during the period when the voltage and current have different polarities as a result of the phase lag introduced by the reactive load, the load current is provided at the zero volts level. As may be seen from diagram 3B, this results in a considerable reduction of the internal losses. Further reduction of the losses may be achieved by adding another step, as shown in diagram 3D. In this case, load current also flows at one half the potential of the positive side of the DC source and at one half the potential of the negative side of the DC source. A simplified version of this double step modification is illustrated in diagram 3C.

Figure 4:
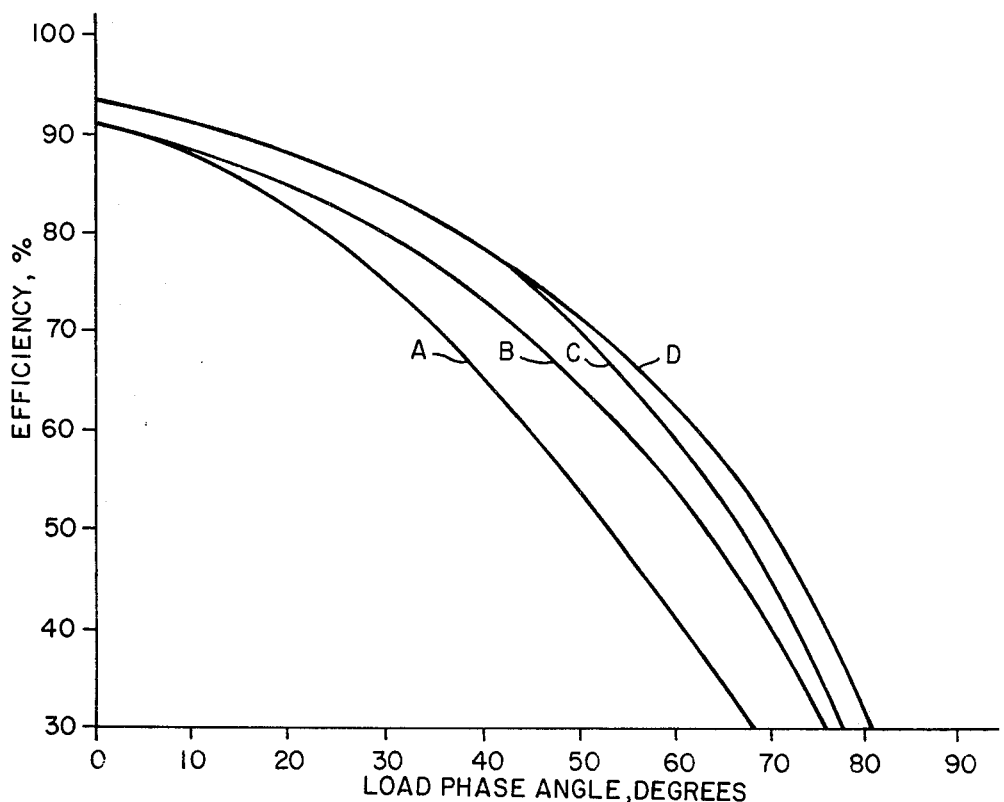
FIG. 4 is a graph illustrating the efficiency of the various amplifier arrangements, for which the voltage conditions are illustrated in FIG. 3, for increasingly reactive loading.

The efficiencies of the four arrangements, for which the voltage conditions are given in FIG. 3, are shown in FIG. 4 as a function of the phase angle of the load. Each of the curves is identified by the letter corresponding to the diagram of FIG. 3. From these curves, it may be seen that the simplified double step version of diagram 3C is nearly as efficient as the complete double step arrangement of diagram 3D. As the additional complexity of the full double step arrangement of diagram 3D is not usually justified, in most applications the simplified double step arrangement of diagram 3C will be preferred. In the preferred embodiment disclosed in more detail in FIGS. 6–9, the simplified double step arrangement has been utilized. Of course, however, it should be recognized that the number of steps utilized may be varied to fit the requirements of a given application and need not be restricted to the simplified double step or to any of the variations shown herein.

Figure 5:
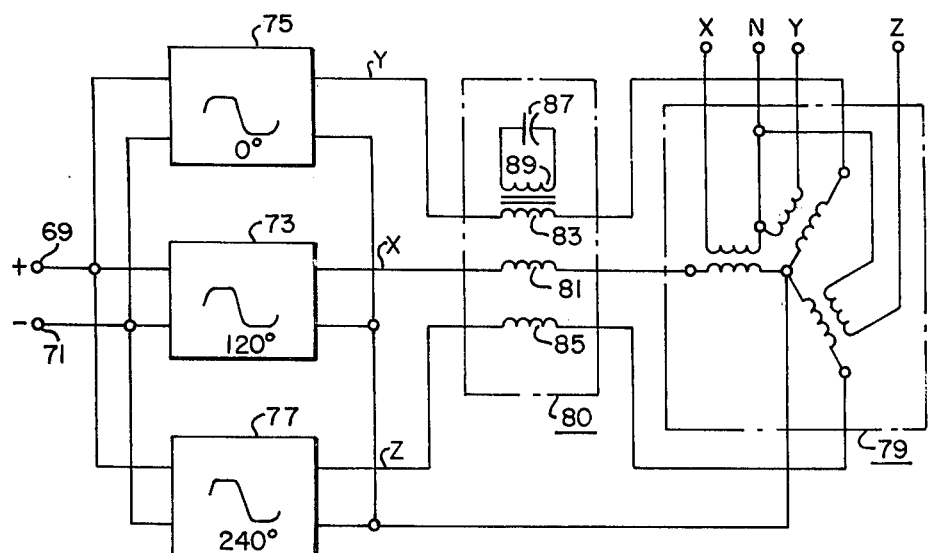
FIG. 5 is a circuit diagram schematically illustrating the filtering aspect of this invention.

The compressed sine waves produced by the generator of FIG. 2 may be amplified by a class B amplifier and then utilized to produce pure sine waves on a line to line basis. However, there is no easy way in which to obtain a line to neutral sine wave, since the line to neutral voltages are the compressed sine waves. Therefore, in order to efficiently handle unbalanced and single phase loads, it is necessary to reform the signals to achieve line to neutral sine waves. A simplified version of the apparatus utilized to achieve this is illustrated in FIG. 5.

DC input is obtained from terminals 69 and 71. Terminal 69 is the positive potential, while terminal 71 is ground in this particular embodiment. Inversion of this input to a compressed sine wave and amplification thereof is schematically illustrated by the boxes 73, 75 and 77. The outputs of these boxes are, respectively, the X, Y and Z phases demonstrated in FIG. 2. Inasmuch as the compressed sine wave is primarily the fundamental and the third harmonic, as illustrated in FIG. 1, a desirable way to achieve a line to neutral sine wave is to filter out the third harmonic. This is achieved by utilizing a three phase transformer wound on a three leg core to provide an effective parallel third harmonic shunt. A three phase transformer would normally be required for isolation and voltage step-up, so that a conservative use of materials is achieved. The use of the three-leg core not only provides a very efficient use of core materials, but provides an excellent third harmonic shunt by virtue of its inability to sustain third harmonic flux variations. In the event that a transformer is not needed for isolation or voltage step-up, the transformer 79 could have a much smaller three-leg core and only primary windings to provide the third harmonic shunt function.

In addition, it is desirable to have third harmonic blocking series filters to prevent the third harmonic from reaching the output. This may be achieved by utilizing a series inductor in each phase, such as inductors 81, 83 and 85. However, in order to avoid excessive internal voltage drops across the inductors, it is desirable to provide parallel resonant circuits. This may be achieved by utilizing a capacitor 87 which is resonated with the inductors 81, 83 and 85. Inasmuch as the third harmonic voltages of all three phases are identical in phase and amplitude, it is possible to simultaneously filter all phases with the same filter. Thus, inductors 81, 83 and 85 could be separate windings of a single gapped iron core choke which are transformer coupled to the capacitor 87 by yet another winding 89. By thus transformer coupling the capacitor to the inductive windings, the capacitance required for resonance may be minimized.

By removing the third harmonic by utilization of the parallel resonant third harmonic band stop filter and the third harmonic shunt, the only voltage appearing across the transformer is the fundamental. Since the transformer now has three sine wave voltages, the common point of these voltages is now a true neutral for the three phase output.

FIGS. 6–9 illustrate in detail a preferred embodiment of the subject invention. In selecting the input voltage, a DC source 91 (shown schematically as a battery) having a potential of 28 volts was chosen as being representative of a typical inverter requirement, although the use of an input voltage of approximately 200 volts would have permitted elimination of the output transformer and improvement of the inverter's efficiency by reducing transistor losses. A power level of 1000 watts was selected as being a common inverter requirement and one which permitted comparison of compressed sine wave inversion with other technologies.

Figure 6:
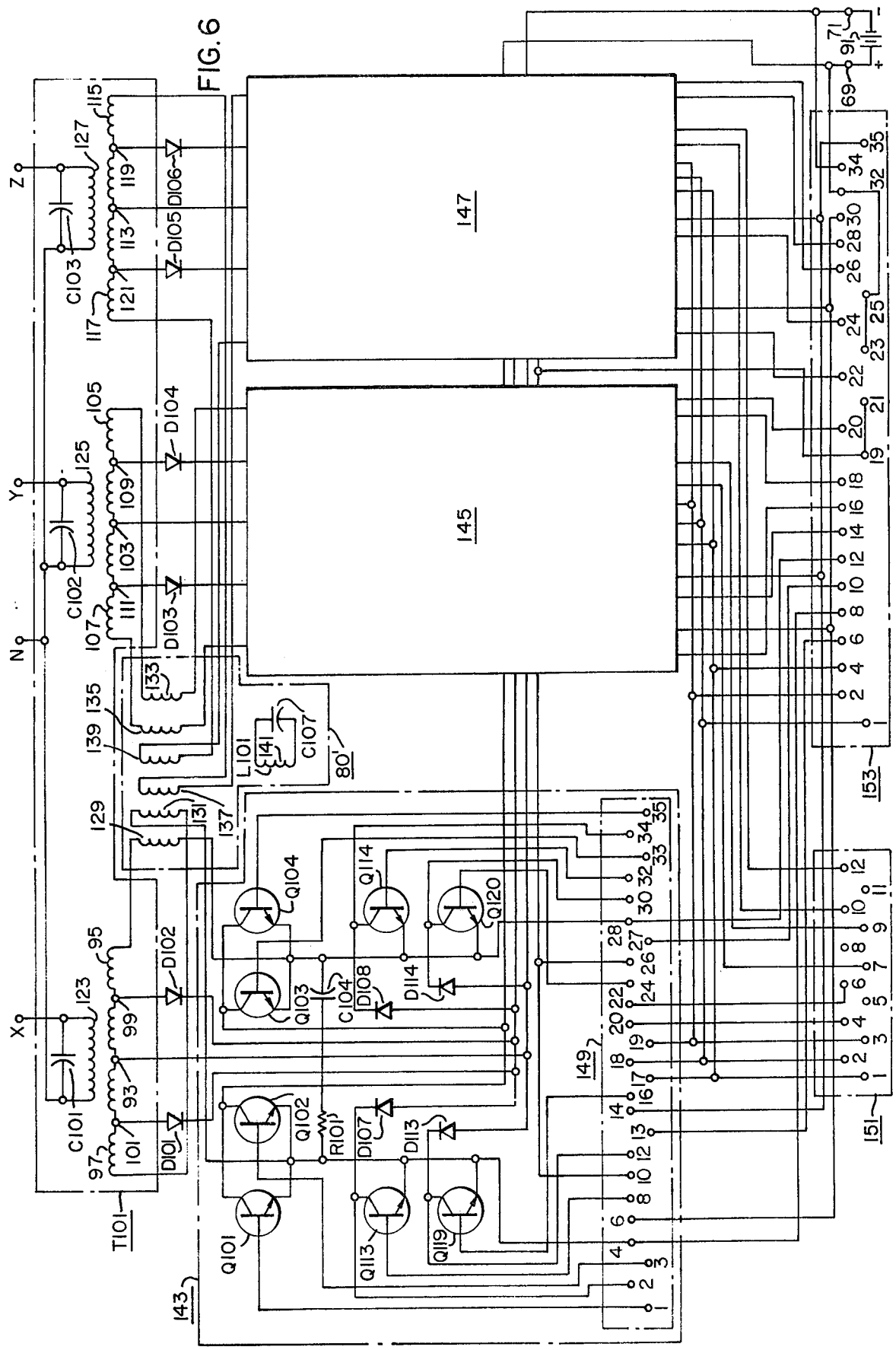
FIG. 6 is a circuit of the preferred embodiment of this invention.

FIG. 6 illustrates the output portion of the inverter. It may be seen that the output transformer T101 has been constructed to operate in a push-pull mode, as opposed to the more simplified transformer arrangement 79, illustrated in FIG. 5. The primary winding of a first phase (identified as X) of transformer T101 has a center tap 93. Center tap 93 divides the primary winding of phase X into two sections 95 and 97. Section 95 of the primary winding has a center tap 99, while section 97 has a center tap 101.

In a similar fashion, the primary winding of a second phase (identified as Y) has a center tap 103, which divides the primary winding into sections 105 and 107. Sections 105 and 107 have center taps 109 and 111, respectively. Similarly, the primary winding of the third phase (identified as Z) has a center tap 113, which divides the primary winding into sections 115 and 117 with center taps 119 and 121, respectively.

A secondary winding 123 provides the phase X output, while secondary windings 125 and 127 provide the phase Y and phase Z outputs, respectively. Capacitors C101, C102 and C103 are connected across the secondary windings 123, 125 and 127, respectively, in order to tune out the equivalent shunt inductance of the three phase transformer T101. This has been done primarily to increase the efficiency of the inverter, but the effect is so small that the capacitors C101, C102 and C103 may be left out of the system without significantly degrading performance. These capacitors C101, C102 and C103 are not carefully selected to satisfy their resonance requirement; in fact, they are somewhat larger in order to allow them to counteract some anticipated inductive reactance in the load. Capacitors C101, C102 and C103 serve yet another function in that they provide a very low impedance path at high frequencies, and thus they serve to bypass the effects of possible noise currents, caused by some types of loads.

Transformer T101, is a conventional three-phase transformer having a single, or three leg, core. Transformer T101 serves several purposes, the obvious ones being isolation and voltage step-up. A third function of this transformer, as previously described, is that of a third harmonic shunt. By virtue of the fact that a single core, three phase transformer will not support any third harmonic modes, it provides an ideal filter element at all load levels to remove the third harmonic component and thus permit production of three phase sine wave voltages between the lines and a neutral point.

To complete the third harmonic rejection filter, it is necessary to insert a series element to supplement the transformer shunt. This could be just a simple inductor, but in order to avoid excessive internal voltage drops because of this inductor, it is preferable to reduce the value of the inductor and resonate it with a capacitor. In FIG. 6, an inductor L101 is shown having a winding 129 in series with transformer primary winding section 95, a winding 131 in series with transformer primary winding section 97, a winding 133 in series with primary winding section 105, a winding 135 in series with primary winding section 107, a winding 137 in series with primary winding section 115, and a winding 139 in series with primary winding section 117. The windings 129, 131, 133, 135, 137 and 139 of inductor L101 are identical. To reduce the value of these series inductive windings, they are resonated with a capacitor C107. The capacitor C107 is preferably transformer coupled to the windings 129, 131, 133, 135, 137 and 139 by means of a winding 141 in the inductor L101. The use of a single inductor element L101 with multiple windings to provide the necessary third harmonic buck voltage for all three phases is possible, since the phase of the third harmonic which must be rejected is identical in all three phases. As a result of the third harmonic blocking action of the series filter elements formed by the LC parallel resonant circuit L101 and C107 and the third harmonic shunt action of transformer T101, the only voltages appearing across the transformer T101, are the three phase sine wave voltages.

An amplifier stage 143 is illustrated for phase X. Similar amplifier stages 145 and 147 are utilized for phases Y and Z, respectively, but as these amplifier stages are identical to amplifier stage 143, they have not been illustrated in detail but are shown simply as boxes.

Each of the amplifier stages 143, 145 and 147 is arranged to provide the voltage conditions illustrated in diagram C of FIG. 3. In the amplifying arrangement 143, a first push-pull class B amplifier is provided by transistors Q101, Q102, Q103 and Q104. These transistors have their collectors connected directly to the positive input bus (i.e., terminal 69) of the DC source of supply potential 91. Operation of this push-pull amplifier could be achieved by utilization of just transistors Q101 and Q103, but performance of the amplifier may be improved by adding the parallel transistors Q102 and Q104, since this amplifier will be carrying the maximum inverter current and will be experiencing the highest dissipation.

A second push-pull class B amplifier is produced by transistors Q119 and Q120. The collectors of transistors Q119 and Q120 are connected to the negative or reference side of source 91 (i.e., terminal 71) through diodes D113 and D114, respectively. This amplifier provides a low dissipation path for reactive load currents by essentially shunting the load with the second amplifier transistors, rather than provide the normal current flow path through the main DC supply. Thus, although the reactive load power is dissipated, no additional DC power is wasted.

A third push-pull class B amplifier is formed by transistors Q113 and Q114. The collectors of transistors Q113 and Q114 are supplied with a supply voltage that is approximately one half of the positive DC supply potential from source 91. The supply voltage applied to transistors Q113 and Q114 is achieved by rectification of the voltages taken from the center taps of primary sections 95 and 97. Rectification of these voltages is achieved by diodes D101 and D102, which are connected to center taps 101 and 99, respectively, of sections 97 and 95. Similar derivation of a supply voltage at approximately one half the magnitude of the potential of source 91, is achieved for amplifier stage 145 by diodes D103 and D104 and for amplifier stage 147 by diodes D105 and D106. The supply voltage of approximately one half the potential of source 91 is conveyed to the collector of transistor Q113 through a diode D107 and to the collector of transistor Q114 through a diode D108.

With the arrangement thus described, it is apparent that the first class B amplifier provides load current at an internal voltage equal to the positive or maximum potential of source 91, that the third class B amplifier provides current flow at an internal voltage equal to approximately one half the potential of source 91, and that the second class B amplifier provides current flow at the zero or reference voltage level, which in this case corresponds to the negative side of source 91. Transistors Q101, Q102, Q103, Q104, Q113, Q114, Q119 and Q120 drive the push-pull primary sections 95 and 97 of transformer T101 in an emitter follower fashion. Thus, it may be seen that the emitters of these transistors are connected to the primary transformer sections 95 and 97 through the appropriate windings 129 and 131 of inductor L101.

A stabilizing network having a resistor R101 connected in series with a capacitor C104 is utilized in each of the amplifying stages 143, 145 and 147. The stabilizing network is connected between the emitters of Q101, Q102, Q113 and Q119, on the one hand, and Q103, Q104, Q114 and Q120, on the other hand. This stabilizing network of R101 and C104 stabilizes the output stages for all conditions of loading. Without such a stabilizing network, the arrangement has a tendency towards spurious oscillation which causes unwanted dissipation and constitutes a source of undesired RFI.

Figure 7:
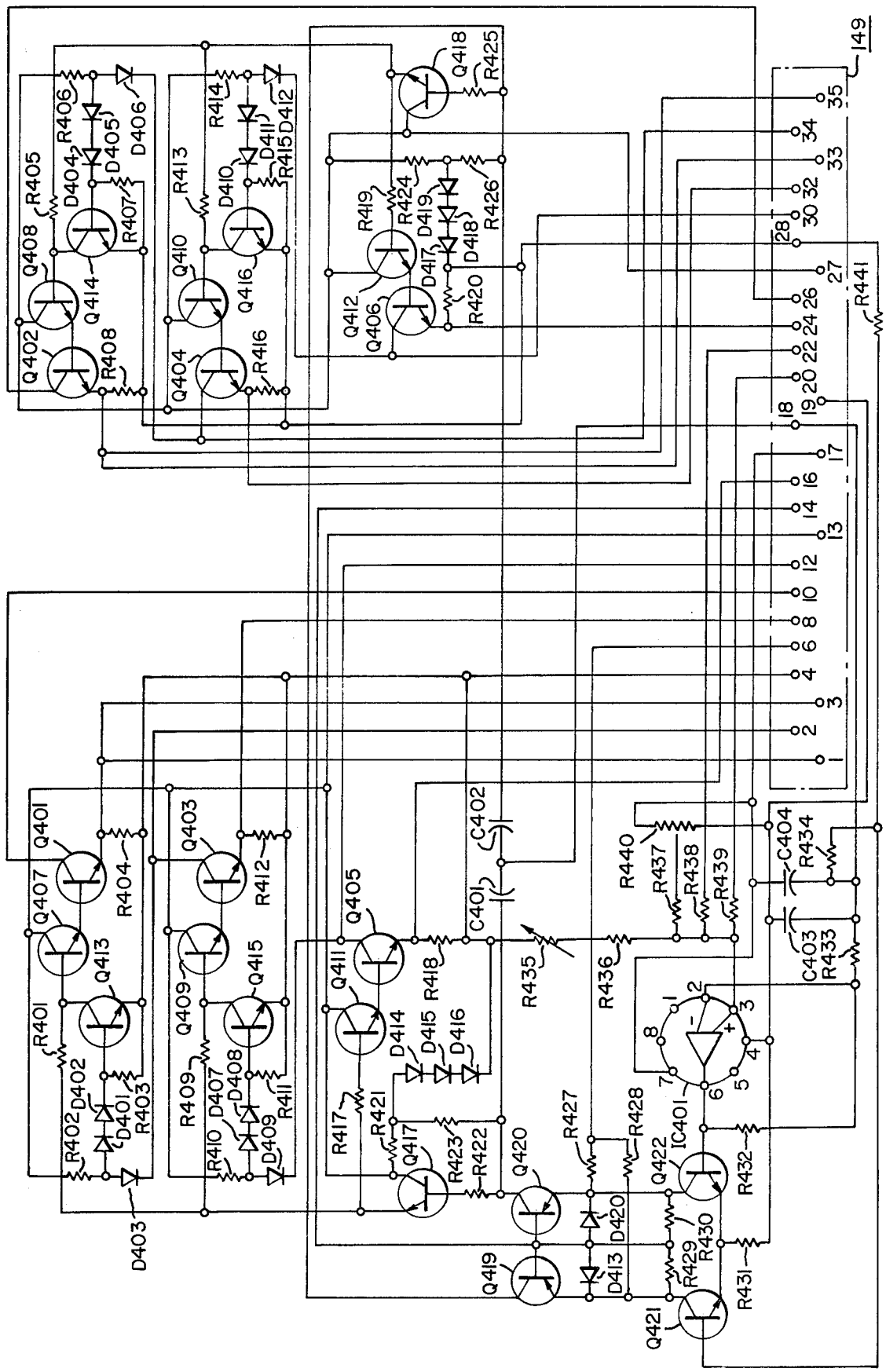
FIG. 7 is a circuit diagram of one portion of the control circuitry for the arrangement illustrated in FIG. 6.

A driver board 149 is included in each of the amplifier stages 143, 145 and 147. Driver boards 149 relate to the connections to the control or drive circuitry, which is illustrated in FIG. 7. Similarly, a waveform standard board 151 demonstrates the connections to the circuitry utilized in forming the fundamental and third harmonic, illustrated in FIG. 8. Finally, a low voltage power supply board 153 is utilized to illustrate the connections to the source of low voltages that are required at various points in the circuitry. The low voltage power supply is illustrated in FIG. 9.

Figure 9:
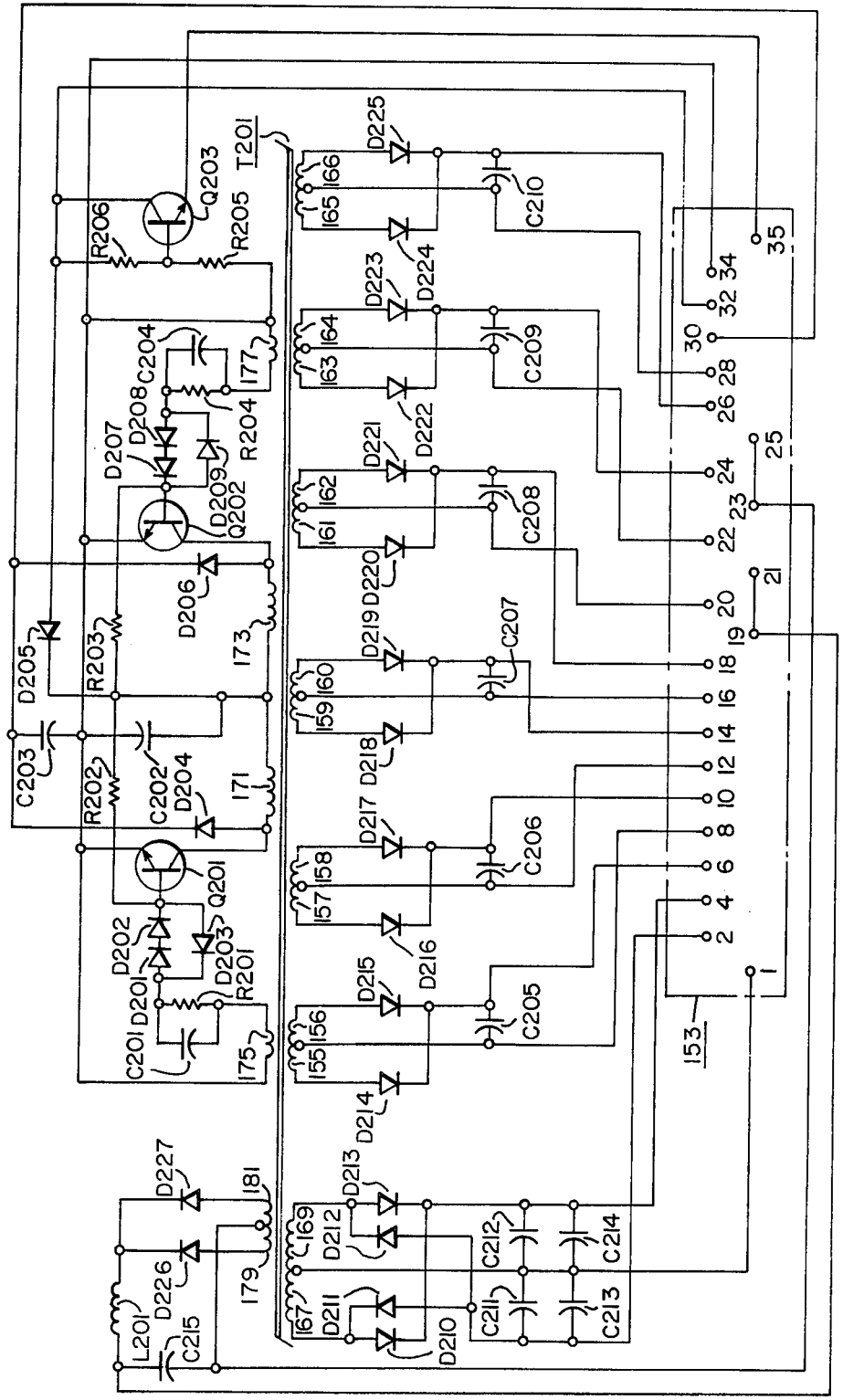
FIG. 9 is a circuit diagram of another portion of the control circuitry for the arrangement illustrated in FIG. 6.

With reference first to FIG. 9, the low voltage power supply circuitry associated with low voltage power supply board 153 is shown. The low voltage power supply is necessary to provide the necessary power for the low level logic and drive circuitry of the system. It is basically a conventional Royer circuit employing a transformer T201 which has a multitude of rectified secondaries. Six identical secondaries, comprising windings 155–166, supply approximately 10 volts DC, which are connected to terminals 6, 10, 14, 18, 22 and 26 of low voltage power supply voltage board 153 through diodes D214–D225. Center taps of the six secondaries are connected to terminals 8, 12, 16, 20, 24 and 28 of the low voltage power supply board 153. These latter terminals are connected to the common emitters of the transistors in the amplifier stages 143, 145 and 147, as well as the terminals 4 and 28 on the driver boards 149. The terminals 6, 10, 14, 18, 22 and 26 are connected to terminals 13 and 27 of the driver boards, and, as will be seen, supply the power for transistors utilized in the control of the transistors in the amplifying stages 143, 145 and 147. These terminals are each connected to the center tap of the corresponding secondary winding by storage capacitors C205–C210, which serve to smooth the supply voltages.

Another secondary of transformer T201 formed of windings 167 and 169 provides nominal +15 volt and −15 volt supplies to power the low level logic and oscillator circuitry of the inverter. These voltages are obtained by a full wave rectification arrangement utilizing appropriate diodes D210–D213. These voltages are connected to terminals 2 and 4 of the low voltage power supply board 153, which are connected to the center tap of the secondary winding through storage or ripple smoothing capacitors C211–C214. The center tap of this secondary winding is also connected to terminal 1 on the low voltage power supply board 153.

A voltage level of approximately twice the magnitude of the potential of the DC voltage source 91 is required for biasing portions of the driver circuitry. The desired bias voltage is provided in two separate fashions by the arrangement including secondary windings 171, 173, 175 and 177. The first method of obtaining this bias voltage is through the diodes D204 and D206. This bias voltage is connected to terminal 30 of the low voltage power supply board 153. A storage capacitor C203 is connected between terminal 30 and the negative side of source 91. (As may be seen in FIG. 6, the positive side of source 91 is connected to terminals 23, 25 and 32 of the low voltage power supply board 153, while the negative side of source 91 is connected to terminal 34.)

The second fashion of obtaining the bias voltage of approximately twice the potential of the voltage source 91 is the transistor Q203 and the voltage divider arrangement of resistor R205 and R206. This bias voltage is applied to terminal 35 of the low voltage power supply board 153.

In obtaining these two similar bias voltages, it may be seen that one side of winding 175 is connected to the negative side of DC voltage source 91, while the other side thereof is connected to the base of transistor Q201 through a first parallel arrangement of C201 and R201 and a second parallel arrangement of series diodes D201 and D202 in parallel with a diode D203, which is connected in a reverse polarity from the series diodes D201 and D202. The positive side of DC source 91 is connected to the midpoint of the secondary winding comprising windings 171 and 173 through a diode D205. This positive voltage appearing at the center tap of this secondary winding is also conveyed to the bases of transistors Q201 and Q202 through the resistors R202 and R203, respectively. This center tap is also connected to the negative side of source 91 through an isolating or storage capacitor C202. Transistor Q202 is supplied with a base signal from secondary winding 177 in the same fashion as transistor Q201 is supplied from winding 175. In other words, a signal from winding 177 is conveyed through a first parallel arrangement of resistor R204 and capacitor C204, which is in series with a second parallel arrangement having diodes D207 and D208 in one leg and a diode D209 in the other leg.

An additional secondary winding of transformer T201, formed of coils 179 and 181, provides a low voltage high current source of approximately 1.5 volts to power some of the driver transistors on the driver boards. This voltage is obtained through diodes D226 and D227 and an inductor L201. This voltage is connected to terminals 19 and 21 on the low voltage power supply board 153, which is connected to the center tap of the secondary winding through a capacitor C215. The center tap of the secondary winding is also connected to terminals 23 and 25 on the low voltage power supply board 153. This 1½ volt source is used to raise the collector voltage of driver transistors in the circuitry of FIG. 7 approximately 1½ volts above the collector voltage of the transistors which they are driving. This permits the driver transistors to drive their respective output transistors fully into saturation, thus achieving maximum efficiency.

Figure 8:
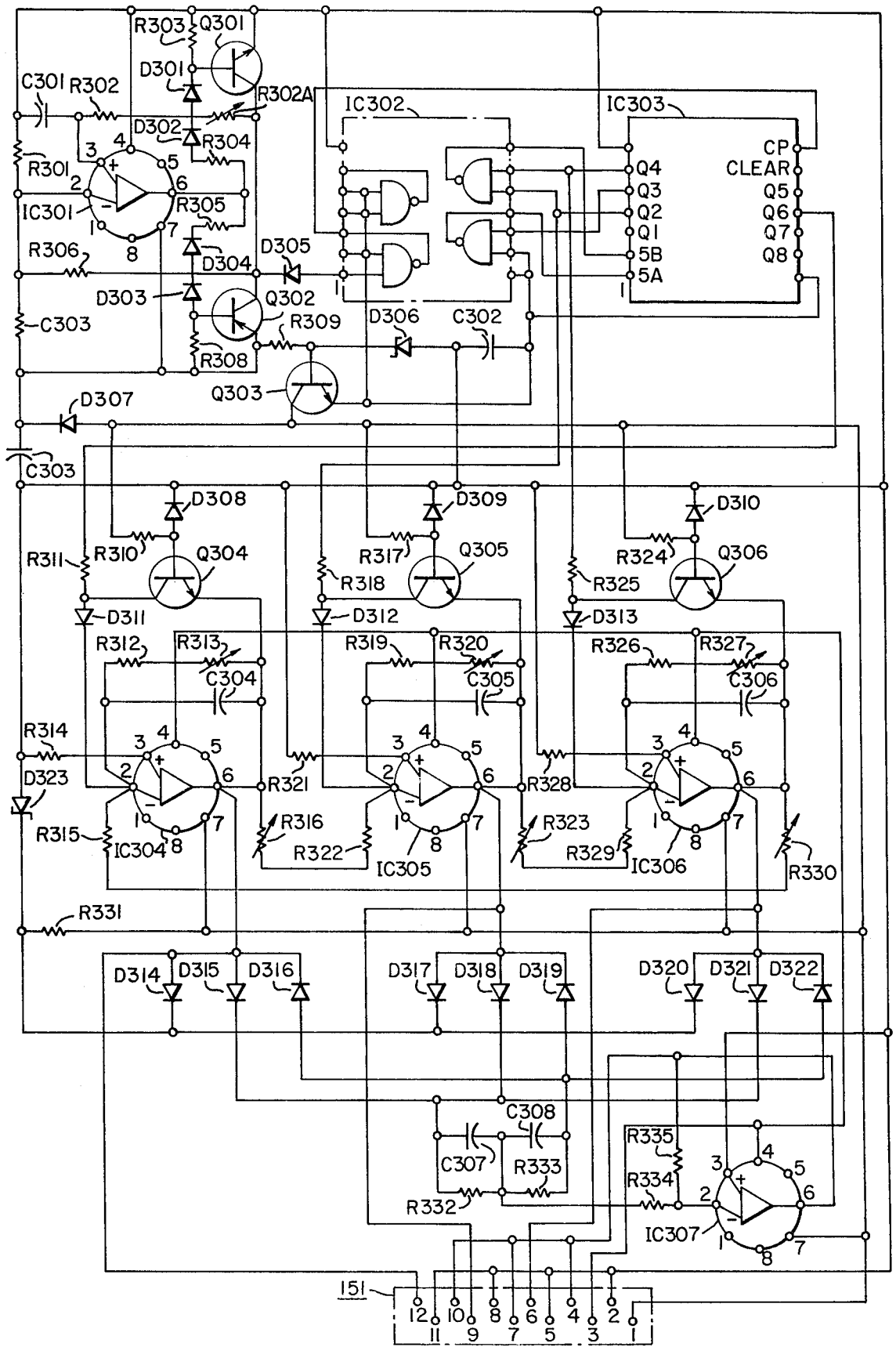
FIG. 8 is a circuit diagram of another portion of the control circuitry for the arrangement illustrated in FIG. 6.

With reference now to the waveform circuitry of FIG. 8, the formation of the fundamental and third harmonic waves, as well as the interconnections to the waveform standard board 151, may be seen. An integrated circuit IC301 is an operational amplifier with external feedback circuitry that is utilized to convert the operational amplifier into an astable multivibrator. In this arrangement, terminal 4 of integrated circuit IC301 is connected to terminal 2 on the waveform standard board 151, which, as may be seen in FIG. 6, is connected to terminal 1 of the low voltage power supply board 153. As seen in FIG. 9, terminal 1 of low voltage power supply board 153 is connected to the reference side of the 15 volt supply. Terminal 7 of integrated circuit IC301 has the positive side of the 15 volt supply (terminal 4 of low voltage power supply board 153 in FIG. 9) connected thereto through a diode D307. (As may be seen in FIG. 6, terminal 1 of waveform standard board 151 is connected to terminal 4 of the low voltage power supply board 153.)

Terminal 2 of integrated circuit IC301 is connected to the midpoint of the voltage divider formed of resistors R301 and R307 that are connected across the +15 volt supply. Terminal 3 of IC301 is connected to the reference side of 15 volt source by a capacitor C301. Terminal 6 of integrated circuit IC301 is also connected to the midpoint of a voltage divider extending across the +15 volt supply. One leg of this voltage divider is connected to the reference side of the source and includes resistors R303 and R304 and diodes D301 and D302. The other leg, connected to the positive side of the supply, contains resistors R305 and R308 and diodes D303 and D304.

Two transistors Q301 and Q302 are connected in series across the +15 volt supply. The emitter of transistor Q301 is connected to the reference side of the supply, while the emitter of transistor Q302 is connected to the positive side of the supply. The collectors of transistors Q301 and Q302 are connected together and are connected to terminal 3 of integrated circuit IC301 through resistors R302 and R302A and to terminal 2 of IC301 through resistor R306. The base of transistor Q301 is supplied from the junction of diode D301 and resistor R303, while the base of transistors Q302 is supplied from the junction of diode D303 and resistor R308. The function of these transistors is to insure that by their saturation the positive and negative peaks of the multivibrator voltage are essentially determined by the regulated power supply voltage. This amplitude regulation is needed to maintain a constant frequency in spite of variations in amplifier performance.

The astable multivibrator formed by integrated circuit IC301 and its external feedback circuitry oscillates at six times the frequency of the desired output fundamental frequency. These oscillations are conveyed to a self-correcting ring counter formed of integrated circuits IC302 and IC303 through a diode D305. The integrated circuits IC302 and IC303 are connected to the positive side of the +15 volt source by a transistor Q303, the base bias for which is obtained from a Zener diode D306 in series with a resistor R309. The positive voltage from the +15 volt supply is taken from across a capacitor C302, which is connected from the emitter of transistor Q303 to the reference side of the +15 volt supply. The self-correcting ring counter produces a three phase square wave at the desired fundamental frequency. The three phase square wave is used to synchronize a three phase sine wave oscillator. The purpose of locking the oscillator to a digital reference is that the inverter can be synchronized by a high precision digital clock to facilitate very accurate frequency stability and synchronization with other inverters.

A three phase sine wave oscillator is formed by three integrated circuit operational amplifiers IC304, IC305 and IC306. Each of these operational amplifiers includes a feedback network which sets the gain at unity and provides for a phase shift of 120° at the fundamental frequency utilized in the system.

An input for each of the operational amplifiers is obtained at terminal 2 of integrated circuits IC304, IC305 and IC306 through diodes D311, D312 and D313, respectively. The sine wave oscillator is locked to the square wave standard of the self-correcting ring counter formed by IC302 and IC303 as a result of the action of transistors Q304, Q305 and Q306, which receive signals from the counter circuit through resistors R311, R318 and R325, respectively. Transistors Q304, Q305 and Q306 send pulses of current to the inputs of the operational amplifiers IC304, IC305 and IC306 whenever waveform zero crossings do not coincide. Bias for each of the transistors Q304, Q305 and Q306 is obtained from a respective series path of resistor R310 and diode D308, resistor R317 and diode D309, or resistor R324 and diode D310, each of which is connected between the positive side of the +15 volt supply and the reference side thereof. The emitters of transistors Q304, Q305 and Q306 are connected to the output terminal 6 of the integrated circuits IC304, IC305 and IC306, respectively.

Terminals 3 of integrated circuits IC304, IC305 and IC306 are connected to the reference side of the +15 volt supply through resistors R314, R321 and R328, respectively. Terminals 4 of the integrated circuits IC304, IC305 and IC306 are connected to the negative side of the −15 volt supply (terminal 3 on the waveform standard board 151, which, as may be seen from FIGS. 6 and 9, is connected to terminal 2 in the low voltage supply board 153). Terminal 7 of the integrated circuits IC304, IC305 and IC306 are connected to the positive side of the +15 volt supply. The outputs of the operational amplifiers IC304, IC305 and IC306 are obtained on terminal 6 thereof and conveyed to terminals 12, 9 and 6 of the waveform standard board 151. The amplitude of the sine wave oscillations obtained on terminal 6 of IC304, IC305 and IC306 are clamped by the action of diodes D314, D317 and D320, respectively, along with the action of the Zener diode D323. Zener diode D323 is connected between the positive and reference sides of the +15 volt supply, in series with the resistor R331. The purpose of this clamping arrangement is to avoid any dependence on the amplifier characteristics for amplitude stability. While this clamping scheme slightly distorts the waveform peaks, the distortion is not sufficient to affect the overall amplifier performance. Another possible arrangement would be to use multiplier integrated circuits to provide a linear feedback and thus reduce the critical adjustment needed to avoid excessive distortions.

Two feedback arrangements are utilized to control the phase and gain of the oscillator signals. A first feedback arrangement of a resistor R312 and a variable resistor R313 in series, with a capacitor C304 connected in parallel with the series combination, provides a gain control that may be varied by adjustment of the variable resistor R313. A similar feedback arrangement including resistor R319, a variable resistor R320, and a capacitor C305 is utilized in connection with IC305, while a feedback network of resistor R326, variable resistor R327 and capacitor C306 is utilized in connection with the operational amplifier IC306.

Control of phase is achieved by three separate feedback arrangements. A first one of these feedback arrangements employs a resistance R322 connected in series with a variable resistor R316 between terminal 6 of integrated circuit IC304 and terminal 2 of integrated circuit IC305. Another feedback arrangement of this type incorporates a resistance R329 and a variable resistor R323 connected in series between terminal 6 of circuit IC305 and terminal 2 of circuit IC306, while a third feedback path incorporating a resistance R315 and a variable resistor R330 is connected between terminal 6 of circuit IC306 and terminal 2 of circuit IC304.

A third harmonic is produced from the outputs of the integrated circuits IC304, IC305, and IC306 by the utilization of diodes D315–D322. These diodes essentially provide full wave rectification of the operational amplifier outputs and connect the signals to either side of series capacitors C307 and C308. A resistor R332 is connected across capacitor C307, while a resistor R333 is connected across capacitor C308. The output of this circuit taken from the center point of capacitor C307 and C308 is conveyed through a resistor R334 to the input terminal 2 of an integrated circuit IC307, utilized in constructing a unity gain inverting amplifier. The output of the inverting amplifier, attained on terminal 6 of IC307, is fed back to the input through resistor R335 and is conveyed to terminals 4, 7 and 10 of the waveform standard board 151. This third harmonic signal on terminals 10, 7 and 4 of the waveform standard board 151 is combined with the three phase fundamental signals on terminals 12, 9 and 6 to produce compressed sine waves. The actual combination of these signals is achieved in the drive or control circuitry illustrated in FIG. 7.

Driver board 149 and the associated drive circuitry is illustrated in FIG. 7. This circuitry is then utilized to control transistors in amplifying stage 143. Identical circuitry is utilized to control the transistors in the amplifying stages 145 and 147.

An integrated circuit IC401 functions as a low gain amplifier stage used mainly to combine the fundamental and third harmonic signals obtained from the waveform standard board. The fundamental waveform on terminal 6 of waveform standard board 151 is conveyed to terminal 22 of driver board 149, as may be seen in FIG. 6. Similarly, the third harmonic appearing on terminal 7 of waveform standard board 151 is conveyed to terminal 20 of the driver board 149. (The other phase signals appearing on terminals 9 and 12 of the waveform standard board 151 are conveyed to the amplifying stages 145 and 147, along with the third harmonic on terminals 4 and 10.) As may be seen in FIG. 7, the fundamental frequency signal on terminal 22 of driver board 149 and the third harmonic signal on terminal 20 are connected to a common point through resistors R438 and R439, respectively. The common point to which the two signals are applied is connected to the input terminal 3 of integrated circuit IC401. The overall gain of the drive circuitry is determined by the setting of a variable feedback resistor R435. R435 is connected in series with a fixed resistor R436 between terminal 3 of integrated circuit IC401 and the 10 volt supply appearing on terminal 6 of the low voltage power supply board 153. A DC offset correction, in order to prevent objectionable DC current flow through the primary of the output transformer, is achieved by utilizing a variable resistor R440. Resistor R440 is connected between the positive and negative 15 volt supplies, and the variable potential obtained therefrom is connected to terminal 3 of integrated circuit IC401 through a resistor R437. Terminal 2 of IC401 is connected to the reference or zero point of the 15 volt source through a resistor R434. The negative 15 volt supply appears across a capacitor C403 and is applied to terminal 4 of the integrated circuit IC401, while the positive 15 volt supply appears across capacitor C404 and is connected to terminal 7 of IC401. The output on terminal 6 of integrated circuit IC401 is fed back to terminal 2 through a resistor R432.

The output signal on terminal 6 of the low gain amplifier integrated circuit IC401 is also applied to the base of the transistor Q422, which, in combination with transistors Q419, Q420 and Q421, forms a differential amplifier network to insure that a base drive signal can never be applied simultaneously to both halves of the push-pull amplifiers in amplifying stage 143. Without this differential amplifier network, such a condition would be possible and would result in excessive dissipation. In this differential amplifier network, the emitters of transistors Q421 and Q422 are connected to the negative side of the —15 volt supply through a resistor R431. The collectors of transistors Q421 and Q422 are interconnected by series resistors R429 and R430. The emitters of transistors Q419 and Q420 are connected to the collectors of transistors Q421 and Q422, respectively. A bias voltage is also applied to the emitters of Q419 and Q420 through resistors R428 and R427, respectively. This bias voltage has a magnitude of approximately twice that of the applied DC source voltage and is obtained from terminal 30 of the low voltage power supply board. Back-to-back diodes D413 and D420 are connected between the emitters of transistors Q419 and Q420. The midpoint of diode D413 and D420 is connected to the midpoint of resistors R429 and R430, as well as to the bases of transistors Q419 and Q420. A bias voltage having a magnitude essentially twice that of the potential of the DC source is obtained for this point from terminal 35 of the low voltage power supply board 153. The compressed sine wave outputs from the collectors of transistors Q419 and Q420 are developed across capacitors C402 and C401, respectively, which have the other sides thereof connected to the reference or zero level of the 15 volt supply.

The compressed sine wave voltage across capacitor C401 is conveyed to the base of the transistor Q417 through a resistor R422. A collector bias voltage is supplied for transistor Q417 by the positive 10 volt supply appearing on terminal 6 of low voltage power supply board 153. This collector bias voltage is produced across the series combination of resistor R421 and diodes D414, D415 and D416. The cathode of diode D416 is connected to the reference or zero side of the 10 volt supply, which is obtained from terminal 8 of low voltage power supply board 153. This collector bias voltage is also conveyed to the collector of transistor Q420 through resistors R421 and R423. In a similar fashion, the compressed sine wave signals produced across capacitor C402 (which, due to the action of the differential amplifier, will never be present when a compressed sine wave signal appears across capacitor C401) is conveyed to the base of a transistor Q418 through a resistor R425. The collector bias voltage for transistor Q418 is obtained from terminal 10 of low voltage power supply board 153 and appears across resistor R424 in series with diodes D417, D418 and D419. This collector bias is also applied to the collector of transistor Q419 through resistors R424 and R426.

The compressed sine wave signal at the emitter of transistor Q417 is applied as a base drive to transistors Q407, Q409 and Q411 through resistors R401, R409 and R417, respectively. Similarly, the compressed sine wave signal at the emitter of transistor Q418 is applied as a base drive to transistors Q408, Q410 and Q412 through resistors R405, R413 and R419, respectively. Transistors Q407–Q412 act as driving transistors for transistors Q401–Q406, respectively. Transistors Q401–Q406 provide the base drive for the transistors of amplifying stage 143. Thus, the emitter of transistor Q401 is connected to the terminals 1 and 3 of driver board 149, which are connected to the bases of transistors Q101 and Q102, as may be seen in FIG. 6. In a similar fashion, the emitters of transistors Q403 and Q405 are connected to the bases of transistors Q113 and Q119, respectively. On the other side of the bridge, the emitter of transistor Q402 is connected to the bases of transistors Q103 and Q104, while the emitters of transistors Q404 and Q406 are connected to the bases of transistors Q114 and Q120, respectively. The collectors of transistors Q403–Q406 are connected to the collectors of the respective transistors which they drive (i.e., transistors Q113, Q114, Q119 and Q120). The collectors of transistors Q401 and Q402, however, are connected to the 1.5 volt supply appearing on terminals 19 and 21 of low voltage power supply board 153. By reason of this connection, the collectors of transistors Q401 and Q402 will be approximately 1.5 volts higher than the voltage on the collectors of the transistors which they are driving, thus driving transistors Q101–Q104 fully into saturation during the peaks of the compressed waves, and thereby minimizing losses to maximize efficiency.

Transistors Q413–Q416 are utilized to achieve the step action illustrated in diagram C of FIG. 3. This is achieved by having transistors Q413–Q416 remove the base drive from the respective transistors Q407–Q410 when a transistor in the amplifying stage 143 having a lower collector voltage is capable of conveying the output current.

When a compressed sine wave base drive voltage appears across capacitor C401, this drive is always applied to transistor Q411, since the collector of transistor Q119 that is driven by transistors Q411 and Q405 is at the zero or reference level. This means that it would always be desirable to have the load current flowing through transistor Q119, if it is capable of carrying this current. However, as transistor Q119 becomes saturated and is incapable of carrying the full load current, a transistor having the next higher collector voltage (i.e., transistor Q113) will have to assume the task of conveying the output current. This control is realized by utilizing a transistor Q415 to determine if base drive is to be applied to transistors Q409 and Q403 (and hence determine whether transistor Q113 will have a base drive). Transistor Q415 has its collector connected to the base of transistor Q409 and its emitter connected to the reference or zero side of the 10 volt supply on terminal 8 of the low voltage power supply board 153. The base of transistor Q415 is normally provided with a drive signal from the positive side of the 10 volt supply through a resistor R410 and diodes D407 and D408. However, the diode D409 is connected from the juncture of resistor R410 and diode D407 to the collector of transistor Q119. Therefore, if transistor Q119 is not saturated, so that at least a small positive voltage appears in the collector thereof, diode D409 will be back-biased to some extent and some drive will be applied to the base of transistor Q415. The resulting conduction of transistor Q415 will remove the base drive from the base of transistor Q409, so that no drive is applied to transistor Q113 in amplifying stage 143. On the other hand, if transistor Q119 is saturated The base drive intended for transistor Q415 will be shunted through diode D409 and transistor Q415 will be non-conducting. Under these circumstances, the base drive is then applied to transistor Q409 and to transistor Q403 in order to drive the amplifying transistor Q113 in stage 143.

By the same type of arrangement, transistor Q413 will remove the base drive from transistor Q407 unless transistor Q113 is saturated, in which event the base drive for transistor Q413 is bled off through diode D403, which permits the base drive to be applied to transistors Q407 and Q401. The base signal for transistor Q413 is obtained through resistor R402 and diodes D401 and D402. It may be noted that the resistors R403 and R404 connect the base of transistor Q413 and the emitter of transistor Q401, respectively, to the zero or reference side of the 10 volt supply at terminal 8 of the low voltage power supply board 153. Similar connections are provided for the base of transistor Q415 and the emitter of transistor Q403 by resistors R411 and R412, respectively. A resistor R418 also connects the emitter of transistor Q405 to this reference point.

On the other side of the bridge, identical arrangements are made for the step function when the compressed sine wave appears across capacitor C402. Transistor Q416, which has a base drive through resistor R414 and diodes D410 and D411, has its base drive shunted through diode D412 when transistor Q120 is saturated. Similarly, transistor Q414 has its base drive, normally obtained through resistor R406 and diodes D404 and D405, bled off by diode D406 when transistor Q114 is saturated. Resistors R408, R416 and R420 connect the emitters of transistors Q402, Q404 and Q406, respectively, to the reference or zero side of the 10 volt source on terminal 12 of low voltage power supply board 153. Resistors R407 and R415 connect the bases of transistor Q414 and Q416, respectively, to the same point.

The step operation depicted in diagram C of FIG. 3 may now be explained with reference to the hardware. Starting at the situation during the flattened portion of the compressed sine wave, it may be seen that transistors Q101 and Q102 are carrying the load current, because transistor Q113 is saturated, which removes the base drive from transistor Q413 and permits the compressed sine wave drive to be applied to transistors Q407 and Q401. As the output voltage drops below the bias voltage applied to the collector of transistor Q113, transistor Q113 is no longer saturated, which permits transistor Q413 to conduct and remove the base drive from transistors Q407 and Q401. At this point, the load current is conveyed through transistor Q113, since transistor Q119 is still saturated.

At the time that the compressed sine wave crosses the reference level, the voltage no longer appears across capacitor C401, but instead appears across capacitor C402. However, due to the reactive load, the current does not change polarity at this point, but continues with the same polarity. Therefore, the circuit is acting in the regenerative mode and the current flows from the reactive through the transistor Q120. This reverse flow of current does not, of course, saturate the transistor Q120, so transistor Q416 removes the base drive from transistors Q410 and Q404. At the point that the current crosses the reference line (in this example), the voltage level of the compressed sine wave is greater than the voltage applied to the collector of transistor Q114, so that the conduction of the load current immediately shifts to transistors Q103 and Q104. The same step mode of operation described for the latter part of the positive half cycle then occurs for the latter part of the negative half cycle.

In order to promote more complete comprehension of this invention, suitable values of the components utilized in the preferred embodiment described above and shown in FIGS. 6–9 are set forth below for purposes of a detailed example of the invention.

| | | Mainframe Components—FIG. 6 |
|---|---|---|
| C101 | 1 | Mfd Capacitor (120 volts, 400 Hz) |
| C102 | 1 | Mfd Capacitor (120 volts, 400 Hz) |
| C103 | 1 | Mfd Capacitor (120 volts, 400 Hz) |
| C104 | 1 | Mfd Capacitor ( 50 volts, 400 Hz) |
| D101 | 409H | Diode (Silicon, Rectifier, 400 volt, 15 amp) |
| D102 | 409H | Diode (Silicon, Rectifier, 400 volt, 15 amp) |
| D103 | 409H | Diode (Silicon, Rectifier, 400 volt, 15 amp) |
| D104 | 409H | Diode (Silicon, Rectifier, 400 volt, 15 amp) |
| D105 | 409H | Diode (Silicon, Rectifier, 400 volt, 15 amp) |
| D106 | 409H | Diode (Silicon, Rectifier, 400 volt, 15 amp) |
| D107 | 409H | Diode (Silicon, Rectifier, 400 volt, 15 amp) |
| D108 | 409H | Diode (Silicon, Rectifier, 400 volt, 15 amp) |
| D113 | 409H | Diode (Silicon, Rectifier, 400 volt, 15 amp) |
| D114 | 409H | Diode (Silicon, Rectifier, 400 volt, 15 amp) |
| L101 | | Inductor (1200 Hz Tuned Filter) |
| | | Core: Strip — Type L-8 |
| | | Coil 1–2 10 Turns No. 13 |
| | | Coil 3–4 10 Turns No. 13 |
| | | Coil 5–6 10 Turns No. 13 |
| | | Coil 7–8 10 Turns No. 13 |
| | | Coil 9–10 10 Turns No. 13 |
| | | Coil 11–12 10 Turns No. 13 |
| | | Coil 13–14 77 Turns No. 13 |
| | | Total Air Gap = 8 Mils. |
| | | Adjust turns of coil 13–14 to resonate with a 5 Mfd. capacitor (C107) at 1800 Hz. |
| Q101 | 2N3773 | Transistor (Silicon, NPN, TO-3) |
| Q102 | 2N3773 | Transistor (Silicon, NPN, TO-3) |
| Q103 | 2N3773 | Transistor (Silicon, NPN, TO-3) |
| Q104 | 2N3773 | Transistor (Silicon, NPN, TO-3) |
| Q113 | 2N3773 | Transistor (Silicon, NPN, TO-3) |
| Q114 | 2N3773 | Transistor (Silicon, NPN, TO-3) |
| Q119 | 2N3773 | Transistor (Silicon, NPN, TO-3) |
| Q120 | 2N3773 | Transistor (Silicon, NPN, TO-3) |
| R101 | 51 | Resistor (Carbon, Composition, 1 watt, 5%) |
| T101 | | Transformer (Power, 400 Hz, Three Phase, 1 KVA) |
| | | Core: 3 Phase Strip — Type TM-38 |
| | | Specifications for each phase: |
| | | Coil 1–2 2 Turns No. 22 |
| | | Coil 2–3 8 Turns No. 13 |
| | | Coil 3–4 12 Turns No. 13 |
| | | Coil 4–5 12 Turns No. 13 |
| | | Coil 5–6 8 Turns No. 13 |
| | | Coil 6–7 2 Turns No. 22 |
| | | Coil 8–9 114 Turns No. 17 |
| | | Driving Circuitry Components — FIG. 7 |
| C401 | 1 | Mfd Capacitor (Ceramic Disc, 500 volts, 10%) |
| C402 | 1 | Mfd Capacitor (Ceramic Disc, 500 volts, 10%) |
| C403 | 0.1 | Mfd Capacitor (Dipped Mylar, 50 volts, 20%)'x |
| C404 | 0.1 | Mfd Capacitor (Dipped Mylar, 50 volts, 20%) |
| D401 | 1N4148 | Diode (Silicon, Logic) |
| D402 | 1N4148 | Diode (Silicon, Logic) |
| D403 | 1N645 | Diode (Silicon, Rectifier) |
| D404 | 1N4148 | Diode (Silicon, Logic) |
| D405 | 1N4148 | Diode (Silicon, Logic) |
| D406 | 1N645 | Diode (Silicon, Rectifier) |
| D407 | 1N4148 | Diode (Silicon, Logic) |
| D408 | 1N4148 | Diode (Silicon, Logic) |
| D409 | 1N645 | Diode (Silicon, Rectifier) |
| D410 | 1N4148 | Diode (Silicon, Logic) |
| D411 | 1N4148 | Diode (Silicon, Logic) |
| D412 | 1N645 | Diode (Silicon, Rectifier) |
| D413 | 1N4148 | Diode (Silicon, Logic) |
| D414 | 1N4148 | Diode (Silicon, Logic) |
| D415 | 1N4148 | Diode (Silicon, Logic) |
| D416 | 1N4148 | Diode (Silicon, Logic) |
| D417 | 1N4148 | Diode (Silicon, Logic) |
| D418 | 1N4148 | Diode (Silicon, Logic) |
| D419 | 1N4148 | Diode (Silicon, Logic) |
| D420 | 1N4148 | Diode (Silicon, Logic) |
| IC401 | 7741 | Integrated Circuit (Operational Amplifier) |
| Q401 | 2N3441 | Transistor (Silicon, NPN, TO-66) |
| Q402 | 2N3441 | Transistor (Silicon, NPN, TO-66) |
| Q403 | 2N3441 | Transistor (Silicon, NPN, TO-66) |

| | | | |
|---|---|---|---|
| Q404 | 2N3441 | | Transistor (Silicon, NPN, TO-66) |
| Q405 | 2N3441 | | Transistor (Silicon, NPN, TO-66) |
| Q406 | 2N3441 | | Transistor (Silicon, NPN, TO-66) |
| Q407 | 2N2219A | | Transistor (Silicon, NPN, TO-5) |
| Q408 | 2N2219A | | Transistor (Silicon, NPN, TO-5) |
| Q409 | 2N2219A | | Transistor (Silicon, NPN, TO-5) |
| Q410 | 2N2219A | | Transistor (Silicon, NPN, TO-5) |
| Q411 | 2N2219A | | Transistor (Silicon, NPN, TO-5) |
| Q412 | 2N2219A | | Transistor (Silicon, NPN, TO-5) |
| Q413 | 2N2219A | | Transistor (Silicon, NPN, TO-5) |
| Q414 | 2N2219A | | Transistor (Silicon, NPN, TO-5) |
| Q415 | 2N2219A | | Transistor (Silicon, NPN, TO-5) |
| Q416 | 2N2219A | | Transistor (Silicon, NPN, TO-5) |
| Q417 | 2N2219A | | Transistor (Silicon, NPN, TO-5) |
| Q418 | 2N2219A | | Transistor (Silicon, NPN, TO-5) |
| Q419 | 2N4356 | | Transistor (Silicon, PNP, TO-5) |
| Q420 | 2N4356 | | Transistor (Silicon, PNP, TO-5) |
| Q421 | 2N2405 | | Transistor (Silicon, NPN, TO-5) |
| Q422 | 2N2405 | | Transistor (Silicon, NPN, TO-5) |
| R401 | 100 | | Ohm Resistor (Carbon, Composition, ¼ Watt, 5%) |
| R402 | 1 | K | Ohm Resistor (Carbon, Composition, ¼ Watt, 5%) |
| R403 | 1 | K | Ohm Resistor (Carbon, Composition, ¼ Watt, 5%) |
| R404 | 30 | | Ohm Resistor (Carbon, Composition, ½ Watt, 5%) |
| R405 | 100 | | Ohm Resistor (Carbon, Composition, ¼ Watt, 5%) |
| R406 | 1 | K | Ohm Resistor (Carbon, Composition, ¼ Watt, 5%) |
| R407 | 1 | K | Ohm Resistor (Carbon, Composition, ¼ Watt, 5%) |
| R408 | 30 | | Ohm Resistor (Carbon, Composition, ½ Watt, 5%) |
| R409 | 300 | | Ohm Resistor (Carbon, Composition, ¼ Watt, 5%) |
| R410 | 3 | K | Ohm Resistor (Carbon, Composition, ¼ Watt, 5%) |
| R411 | 3 | K | Ohm Resistor (Carbon, Composition, ¼ Watt, 5%) |
| R412 | 30 | | Ohm Resistor (Carbon, Composition, ½ Watt, 5%) |
| R413 | 300 | | Ohm Resistor (Carbon, Composition, ¼ Watt, 5%) |
| R414 | 3 | K | Ohm Resistor (Carbon, Composition, ¼ Watt, 5%) |
| R415 | 3 | K | Ohm Resistor (Carbon, Composition, ¼ Watt, 5%) |
| R416 | 30 | | Ohm Resistor (Carbon, Composition, ½ Watt, 5%) |
| R417 | 1 | K | Ohm Resistor (Carbon, Composition, ¼ Watt, 5%) |
| R418 | 30 | | Ohm Resistor (Carbon, Composition, ½ Watt, 5%) |
| R419 | 1 | K | Ohm Resistor (Carbon, Composition, ¼ Watt, 5%) |
| R420 | 30 | | Ohm Resistor (Carbon, Composition, ½ Watt, 5%) |
| R421 | 4.7 | K | Ohm Resistor (Carbon, Composition, ¼ Watt, 5%) |
| R422 | 1 | K | Ohm Resistor (Carbon, Composition, ¼ Watt, 5%) |
| R423 | 4.7 | K | Ohm Resistor (Carbon, Composition, ¼ Watt, 5%) |
| R424 | 4.7 | K | Ohm Resistor (Carbon, Composition, ¼ Watt, 5%) |
| R425 | 1 | K | Ohm Resistor (Carbon, Composition, ¼ Watt, 5%) |
| R426 | 4.7 | K | Ohm Resistor (Carbon, Composition, ¼ Watt, 5%) |
| R427 | 10 | K | Ohm Resistor (Carbon, Composition, ¼ Watt, 5%) |
| R428 | 10 | K | Ohm Resistor (Carbon, Composition, ¼ Watt, 5%) |
| R429 | 1 | K | Ohm Resistor (Carbon, Composition, ¼ Watt, 5%) |
| R430 | 1 | K | Ohm Resistor (Carbon, Composition, ¼ Watt, 5%) |
| R431 | 4.7 | K | Ohm Resistor (Carbon, Composition, ¼ Watt, 5%) |
| R432 | 10 | K | Ohm Resistor (Carbon, Composition, ¼ Watt, 5%) |
| R433 | 160 | | Ohm Resistor (Carbon, Composition, ¼ Watt, 5%) |
| R434 | 20 | K | Ohm Resistor (Carbon, Composition, ¼ Watt, 5%) |
| R435 | 25 | K | Ohm Resistor (Carbon, Potentiometer, ½ Watt, Lin.) |
| R436 | 62 | K | Ohm Resistor (Carbon, Composition, ¼ Watt, 5%) |
| R437 | 1 | K | Ohm Resistor (Carbon, Composition, ¼ Watt, 5%) |
| R438 | 10 | K | Ohm Resistor (Metal Film, ¼ Watt, 1%) |
| R439 | 10 | K | Ohm Resistor (Metal Film, ¼ Watt, 1%) |
| R440 | 25 | K | Ohm Resistor (Carbon, Potentiometer, ½ Watt, Lin.) |
| R441 | 1.6 | K | Ohm Resistor (Carbon, Composition, ½ Watt, 5%) |

Waveform Standard Components — FIG. 8

| | | |
|---|---|---|
| C301 | 0.01 | Mfd Capacitor (Dipped Mylar, 50 volts, 10%) |
| C302 | 0.22 | Mfd Capacitor (Dipped Mylar, 50 volts, 10%) |
| C303 | 50 | Mfd Capacitor (Electrolytic, 25 volts, 20%) |
| C304 | 0.047 | Mfd Capacitor (Dipped Mylar, 50 volts, 10%) |
| C305 | 0.047 | Mfd Capacitor (Dipped Mylar, 50 volts, 10%) |
| C306 | 0.047 | Mfd Capacitor (Dipped Mylar, 50 volts, 10%) |
| C307 | 1 | Mfd Capacitor (Dipped Mylar, 100 volts, 10%) |
| C308 | 1 | Mfd Capacitor (Dipped Mylar, 100 volts, 10%) |
| D301 | D4 | Diode (Silicon, Logic) |
| D302 | D4 | Diode (Silicon, Logic) |
| D303 | D4 | Diode (Silicon, Logic) |
| D304 | D4 | Diode (Silicon, Logic) |
| D305 | D4 | Diode (Silicon, Logic) |
| D306 | 1N3826A | Diode (Silicon, Zener, 5.1 volts, 1 watt) |
| D307 | 1N645 | Diode (Silicon, Rectifier) |
| D308 | D4 | Diode (Silicon, Logic) |
| D309 | D4 | Diode (Silicon, Logic) |
| D310 | D4 | Diode (Silicon, Logic) |
| D311 | D4 | Diode (Silicon, Logic) |
| D312 | D4 | Diode (Silicon, Logic) |
| D313 | D4 | Diode (Silicon, Logic) |
| D314 | D4 | Diode (Silicon, Logic) |
| D315 | D4 | Diode (Silicon, Logic) |
| D316 | D4 | Diode (Silicon, Logic) |
| D317 | D4 | Diode (Silicon, Logic) |
| D318 | D4 | Diode (Silicon, Logic) |
| D319 | D4 | Diode (Silicon, Logic) |
| D320 | D4 | Diode (Silicon, Logic) |

| | | |
|---|---|---|
| D321 | D4 | Diode (Silicon, Logic) |
| D322 | D4 | Diode (Silicon, Logic) |
| D323 | 1N752A | Diode (Silicon, Zener, 5.6 volts, 0.4 watt) |
| | | |
| IC301 | 7741 | Integrated Circuit (Operational Amplifier) |
| IC302 | SN7400N | Integrated Circuit (Quad P-Input Nand) |
| | | |
| IC303 | NS857ON | Integrated Circuit (8-Bit Shift Register) |
| IC304 | 7741 | Integrated Circuit (Operational Amplifier) |
| IC305 | 7741 | Integrated Circuit (Operational Amplifier) |
| IC306 | 7741 | Integrated Circuit (Operational Amplifier) |
| IC307 | 7741 | Integrated Circuit (Operational Amplifier) |
| | | |
| Q301 | 2N2222A | Transistor (Silicon, NPN, TO-18) |
| Q302 | 2N8807A | Transistor (Silicon, PNP, TO-65) |
| Q304 | 2N2222A | Transistor (Silicon, NPN, TO-18) |
| Q305 | 2N2222A | Transistor (Silicon, NPN, TO-18) |
| Q306 | 2N2222A | Transistor (Silicon, NPN, TO-18) |
| | | |
| R301 | 20 K | Ohm Resistor (Carbon, Composition, ¼ watt, 5%) |
| R302 | 10 K | Ohm Resistor (Carbon, Composition, ¼ watt, 5%) |
| R302A | 10 K | Ohm Resistor (Carbon, Potentiometer, ½ watt, Lin.) |
| R303 | 1 K | Ohm Resistor (Carbon, Composition, ¼ watt, 5%) |
| R304 | 10 K | Ohm Resistor (Carbon, Composition, ¼ watt, 5%) |
| R305 | 10 K | Ohm Resistor (Carbon, Composition, ¼ watt, 5%) |
| R306 | 10 K | Ohm Resistor (Carbon, Composition, ¼ watt, 5%) |
| R307 | 20 K | Ohm Resistor (Carbon, Composition, ¼ watt, 5%) |
| R308 | 1 K | Ohm Resistor (Carbon, Composition, ¼ watt, 5%) |
| R309 | 1 K | Ohm Resistor (Carbon, Composition, ½ watt, 5%) |
| R310 | 30 K | Ohm Resistor (Carbon, Composition, ¼ watt, 5%) |
| R311 | 10 K | Ohm Resistor (Carbon, Composition, ¼ watt, 5%) |
| R312 | 10 K | Ohm Resistor (Carbon, Composition, ¼ watt, 5%) |
| R313 | 10 K | Ohm Resistor (Carbon, Potentiometer, ½ watt, Lin.) |
| R314 | 4.7 K | Ohm Resistor (Carbon, Composition, ¼ watt, 5%) |
| R315 | 4.7 K | Ohm Resistor (Carbon, Composition, ¼ watt, 5%) |
| R316 | 5 K | Ohm Resistor (Carbon, Potentiometer, ½ watt, Lin.) |
| R317 | 30 K | Ohm Resistor (Carbon, Composition, ¼ watt, 5%) |
| R318 | 10 K | Ohm Resistor (Carbon, Composition, ¼ watt, 5%) |
| R319 | 10 K | Ohm Resistor (Carbon, Composition, ¼ watt, 5%) |
| R320 | 10 K | Ohm Resistor (Carbon, Potentiometer, ½ watt, Lin.) |
| R321 | 4.7 K | Ohm Resistor (Carbon, Composition, ¼ watt, 5%) |
| R322 | 4.7 K | Ohm Resistor (Carbon, Composition, ¼ watt, 5%) |
| R323 | 5 K | Ohm Resistor (Carbon, Potentiometer, ½ watt, Lin.) |
| R324 | 30 K | Ohm Resistor (Carbon, Composition, ¼ watt, 5%) |
| R325 | 10 K | Ohm Resistor (Carbon, Composition, ¼ watt, 5%) |
| R326 | 10 K | Ohm Resistor (Carbon, Composition, ¼ watt, 5%) |
| R327 | 10 K | Ohm Resistor (Carbon, Potentiometer, ½ watt, Lin.) |
| R328 | 4.7 K | Ohm Resistor (Carbon, Composition, ¼ watt, 5%) |
| R329 | 4.7 K | Ohm Resistor (Carbon, Composition, ¼ watt, 5%) |
| R330 | 5 K | Ohm Resistor (Carbon, Potentiometer, ½ watt, Lin.) |
| R331 | 10 K | Ohm Resistor (Carbon, Composition, ¼ watt, 5%) |
| R332 | 100 K | Ohm Resistor (Carbon, Composition, ¼ watt, 5%) |
| R333 | 100 K | Ohm Resistor (Carbon, Composition, ¼ watt, 5%) |
| R334 | 81 K | Ohm Resistor (Carbon, Composition, ¼ watt, 5%) |
| R335 | 91 K | Ohm Resistor (Carbon, Composition, ¼ watt, 5%) |

Low Voltage Power Supply Components — FIG. 9

| | | |
|---|---|---|
| C201 | 0.1 | Mfd Capacitor (Dipped Mylar, 50 volts, 20%) |
| C202 | 500 | Mfd Capacitor (Electrolytic, 50 volts, 20%) |
| C203 | 1 | Mfd Capacitor (Dipped Mylar, 100 volts, 20%) |
| C204 | 0.1 | Mfd Capacitor (Dipped Mylar, 50 volts, 20%) |
| C205 | 1 | Mfd Capacitor (Dipped Mylar, 100 volts, 20%) |
| C206 | 1 | Mfd Capacitor (Dipped Mylar, 100 volts, 20%) |
| C207 | 1 | Mfd Capacitor (Dipped Mylar, 100 volts, 20%) |
| C208 | 1 | Mfd Capacitor (Dipped Mylar, 100 volts, 20%) |
| C209 | 1 | Mfd Capacitor (Dipped Mylar, 100 volts, 20%) |
| C210 | 1 | Mfd Capacitor (Dipped Mylar, 100 volts, 20%) |
| C211 | 1 | Mfd Capacitor (Dipped Mylar, 100 volts, 20%) |
| C212 | 1 | Mfd Capacitor (Dipped Mylar, 100 volts, 20%) |
| C213 | 50 | Mfd Capacitor (Electrolytic, 25 volts, 20%) |
| C214 | 50 | Mfd Capacitor (Electrolytic, 25 volts, 20%) |
| C215 | 3000 | Mfd Capacitor (Electrolytic, 6 volts, 20%) |
| | | |
| D201 | 1N645 | Diode (Silicon, Rectifier) |
| D202 | 1N645 | Diode (Silicon, Rectifier) |
| D203 | 1N645 | Diode (Silicon, Rectifier) |
| D204 | 1N645 | Diode (Silicon, Rectifier) |
| D205 | 1N645 | Diode (Silicon, Rectifier) |
| D206 | 1N645 | Diode (Silicon, Rectifier) |
| D207 | 1N645 | Diode (Silicon, Rectifier) |
| D208 | 1N645 | Diode (Silicon, Rectifier) |
| D209 | 1N645 | Diode (Silicon, Rectifier) |
| D210 | 1N645 | Diode (Silicon, Rectifier) |
| D211 | 1N645 | Diode (Silicon, Rectifier) |
| D212 | 1N645 | Diode (Silicon, Rectifier) |
| D213 | 1N645 | Diode (Silicon, Rectifier) |
| D214 | 1N645 | Diode (Silicon, Rectifier) |
| D215 | 1N645 | Diode (Silicon, Rectifier) |
| D216 | 1N645 | Diode (Silicon, Rectifier) |
| D217 | 1N645 | Diode (Silicon, Rectifier) |
| D218 | 1N645 | Diode (Silicon, Rectifier) |

| | | |
|---|---|---|
| D219 | 1N645 | Diode (Silicon, Rectifier) |
| D220 | 1N645 | Diode (Silicon, Rectifier) |
| D221 | 1N645 | Diode (Silicon, Rectifier) |
| D222 | 1N645 | Diode (Silicon, Rectifier) |
| D223 | 1N645 | Diode (Silicon, Rectifier) |
| D224 | 1N645 | Diode (Silicon, Rectifier) |
| D226 | 1N8439 | Diode (Silicon, Rectifier) 6 Amp, 50 volt, F.R.) |
| D227 | 1N3479 | Diode (Silicon, Rectifier) 6 Amp, 50 Volt, F.R.) |
| | | |
| L201 | 680 | UHY Choke (4 Amp, Ferrite Core) |
| | | |
| Q201 | 2N3767 | Transistor (Silicon, NPN, TO-66) |
| Q202 | 2N3767 | Transistor (Silicon, NPN, TO-66) |
| Q203 | 2N2219A | Transistor (Silicon, NPN, TO-5) |
| | | |
| R201 | 51 | Ohm Resistor (Carbon, Composition, ½ watt, 5%) |
| R202 | 4.7 K | Ohm Resistor (Carbon, Composition ¼ watt, 5%) |
| R203 | 4.7 K | Ohm Resistor (Carbon, Composition, ¼ watt, 5%) |
| R204 | 51 | Ohm Resistor (Carbon, Composition, ½ watt, 5%) |
| R205 | 3.6 K | Ohm Resistor (Carbon, Composition, ¼ watt, 5%) |
| R206 | 2 K | Ohm Resistor (Carbon, Composition, ¼ watt, 5%) |

T201     Transformer (Saturable)

| Core: | | Toroid — Type | 4635-D-1 |
|---|---|---|---|
| Coil | 1–2 | 83 Turns | No. 84 |
| Coil | 2–3 | 83 Turns | No. 84 |
| Coil | 4–5 | 16 Turns | No. 31 |
| Coil | 6–7 | 16 Turns | No. 31 |
| Coil | 8–9 | 46 Turns | No. 31 |
| Coil | 9–10 | 46 Turns | No. 31 |
| Coil | 11–12 | 32 Turns | No. 29 |
| Coil | 12–13 | 32 Turns | No. 29 |
| Coil | 14–15 | 32 Turns | No. 29 |
| Coil | 15–16 | 32 Turns | No. 29 |
| Coil | 17–18 | 32 Turns | No. 29 |
| Coil | 18–19 | 32 Turns | No. 29 |
| Coil | 20–21 | 38 Turns | No. 29 |
| Coil | 21–22 | 38 Turns | No. 29 |
| Coil | 23–24 | 39 Turns | No. 29 |
| Coil | 24–25 | 32 Turns | No. 29 |
| Coil | 26–27 | 38 Turns | No. 29 |
| Coil | 27–28 | 38 Turns | No. 39 |
| Coil | 29–30 | 8 Turns | No. 17 |
| Coil | 30–31 | 8 Turns | No. 17 |

A brief summary of the preferred embodiment discussed above and disclosed in FIGS. 6–9 may now be easily followed. The fundamental and third harmonic frequencies (400 Hz and 1200 Hz, respectively, in this particular example), produced in the waveform standard circuitry of FIG. 8 are combined in the drive circuitry of FIG. 7 to produce the desired compressed sine wave. A bridge having two identical halves or sets of control circuits is provided with the compressed sine wave. A differential amplifier utilizing transistors Q419–Q422 insures that only one control circuit in the bridge will be provided with the compressed sine wave signal at any one time. The control circuits are utilized to control the class B amplifiers in FIG. 6 such that a particular amplifier will only carry the load current if the amplifiers having lower collector potentials are saturated. The two halves of the drive circuitry bridge (i.e., two control circuits) are utilized because of the push-pull arrangement for the amplifying stages 143, 145 and 147. The amplifiers in the amplifying stage 143 convey the load current to the primary sections of an output transformer in a push-pull fashion. The third harmonic is removed from the signal applied to the primary of the output transformer by a series filter arrangement. Further filtering of the output signal to remove the third harmonic and provide the desired sine wave is achieved by winding the transformer on a three leg core, which inherently provides a shunt filter for the third harmonic. Thus, the output of the inverter has a desired sine wave shape not only line to line, but also from line to a common neutral.

With this arrangement, the efficiency of the inverter may be increased to the point that inversion by the utilization of class B amplifiers becomes a viable alternative with many advantages. By providing the arrangement in which line to neutral sine waves may be obtained at the output, as well as from line to line, and coupled with the greatly improved efficiency, the present invention provides an inverter that is greatly improved over prior art inverters. The preferred embodiment disclosed herein has been constructed and yielded an efficiency of 82.5%, which compares favorably with the predicted theoretical maximum efficiency of 93%, as well as to the maximum theoretical efficiency of 78.5% for a conventional class B amplifier. In addition to the other advantages set forth above, it was found that this system is extremely sturdy in the face of faults and overload conditions, as compared to the relative sensitivity of the prior art inverters to such conditions.

It should be understood that various modifications, changes and variations may be made in the arrangements, operations and details of construction of the elements disclosed herein without departing from the spirit and scope of this invention.

I claim:

1. An electrical amplifying arrangement for amplifying a three phase alternating current signal, each phase voltage of the signal having a substantially sinusoidal waveshape with the peaks thereof flattened and consisting primarily of the fundamental and the third harmonic, comprising:

a class B amplifier for each phase of the three phase signal;

a three phase transformer having a three leg core to provide a third harmonic shunt;

an inductor in series with the primary winding of each phase of said transformer; and a capacitor transformer coupled to all of said inductors to form parallel resonant bandstop filler elements.

2. An inverting arrangement for converting a source of direct current supply potential into an alternating current source comprising:

generating means to convert the supply potential into a three phase alternating current signal, each phase voltage of said signal having a substantially sinusoidal waveshape with the peaks thereof flattened and consisting primarily of the fundamental and the third harmonic;

a first class B amplifier for each phase of said three phase alternating current signal, each of said first amplifiers having the supply potential applied thereto;

a second class B amplifier associated with each of said first amplifiers, the output of each of said second amplifiers being connected to the output of the associated first amplifier, and each of said second amplifiers having less than the entire magnitude of the supply potential applied thereto, a three phase transformer having a three leg core connected to receive the outputs of said amplifiers to provide a third harmonic shunt therefor, an inductor in series with the primary winding of each phase of said transformer, a capacitance in parallel with each of said inductors to form parallel resonant third harmonic bandstop filter elements; and control means causing said first amplifiers to carry load current only when the associated second amplifiers are saturated.

3. An inverting arrangement as claimed in claim 2 wherein said capacitance comprises a single capacitor transformer coupled to each of said inductors.

4. An inverting arrangement as claimed in claim 2 and further comprising a third class B amplifier associated with each of said first amplifiers, the output of each of said third amplifiers being connected to the output of the associated first amplifier, each of said third amplifiers having less than the entire magnitude of the supply potential, but a higher magnitude thereof than that applied to said second amplifier, applied thereto, and said control means causing said third amplifiers to carry load current only when the associated second amplifiers are saturated and said first amplifiers to carry load current only when the associated third amplifiers are saturated; wherein each of said third amplifiers has one half the magnitude of the supply potential applied thereto;

each of said second amplifiers has the reference side of the supply potential applied thereto;

said first amplifiers each comprise first and second transistors connected for push-pull operation;

said second amplifiers each comprise third and fourth transistors connected for push-pull operation; and said third amplifiers each comprise fifth and sixth transistors connected for push-pull operations; and wherein:

the primary winding of each phase of said transformer is center-tapped to form first and second sections, the center tap being connected to the reference side of the supply potential;

the emitters of said first, third and fifth transistors are connected to the other end of said first section of a related primary winding of said transformer;

the emitters of said second, fourth and sixth transistors are connected to the other end of said second section of a related primary winding of said transformer; and said first and second sections of the primary windings of said transformer are center-tapped and the center tap is connected to the collectors of the related fifth and sixth transistors to provide the necessary voltage having a potential one half the magnitude of the supply potential.

5. An inverting arrangement as claimed in claim 4 and further comprising:

a first inductor connected between the emitters of said first, third and fifth transistors and the end of said first section of the related primary winding of said transformer for each phase;

a second inductor connected between the emitters of said second, fourth and sixth transistors and the end of said second section of the related primary winding of said transformer for each phase; and a capacitor transformer coupled to all of said first and second inductors to form parallel resonant third harmonic bandstop filter elements.

6. An inverting arrangement as claimed in claim 5 wherein for each phase said control means comprises;

a first switching device connected to the base of said first transistor;

a second switching device connected to the base of said second transistor;

a third switching device connected to the base of said fifth transistor;

a fourth switching device connected to the base of said sixth transistor, said switching devices adapted to block said alternating current signal from being applied to the bases of said transistors unless actuated to pass said signal;

first switch actuating means to actuate said first switching device to pass said signal only when said fifth transistor is saturated;

second switch actuating means to actuate said second switching device to pass said signal only when said sixth transistor is actuated;

third switch actuating means to actuate said third switching device to pass said signal only when said third transistor is saturated; and fourth switch actuating means to said fourth switching device to pass said signal only when said fourth transistor is saturated.

7. An electrical amplifying arrangement for amplifying a three phase alternating current signal, each phase voltage of the signal having a waveshape substantially sinusoidal with the peaks thereof flattened, comprising:

a first class B amplifier for each phase of the three phase alternating current signal, each of said first amplifiers having a first supply voltage of a given magnitude applied thereto;

a second class B amplifier associated with each of said first amplifiers, the output of each of said second amplifiers being connected to the output of the associated first amplifier, and each of said second amplifiers having a second supply voltage applied thereto that has a magnitude less than the magnitude of said first supply voltage;

a third class B amplifier associated with each of first amplifiers, the output of each of said third amplifiers being connected to the output of the associted first amplifier, each of said third amplifiers having a third supply voltage applied thereto that has a magnitude less than the magnitude of said first supply voltage and greater than the magnitude of said second supply voltage; and control means causing said first amplifiers to carry load current only when the associated second amplifiers are saturated, and causing said third amplifiers to carry load current only when the associated second amplifiers are saturated and causing said first amplifiers to carry load current only when said third amplifiers are saturated; wherein said third suppply voltage is one half the magnitude of said first supply voltage; and said second supply voltage is the reference for said first and second supply voltages; wherein said first amplifiers each comprise first and second transistors connected for push-pull operation;

said second amplifiers each comprise third and fourth transistors connected for push-pull operation; and said third amplifiers each comprise fifth and sixth transistors connected for push-pull operation, said first, third and fifth transistors being active for one half cycle of the output current, while said second, fourth and sixth transistors are active for the other half cycle of the output current; wherein said control means comprises:

first switching means associated with each of said first transistors;

second switching means associated with each of said second transistors;

third switching means associated with each of said fifth transistors;

fourth switching means associated with each of said sixth transistors, said switching means adapted to block or pass the alternating current signal; and switch actuating means causing said first switching means to pass the signal only when said fifth transistor is saturated, said third switching means to pass the signal only when said third transistor is saturated, said second switching means to pass the signal only when said sixth transistor is saturated, and said fourth switching means to pass the signal only when said fourth transistor is saturated; wherein:

each of said switching means is a switching transistor; and said switch actuating means comprises a switch actuating transistor associated with each of said switching transistors, each of said switch actuating transistors connected to shunt the signal from the base of the associated switching transistor except when that switching transistor is to pass the signal; wherein:

the alternating current signal consists primarily of the fundamental and the third harmonic; and the amplifying arrangement further comprises filter means to remove the third harmonic from the signal at the output of said amplifiers; wherein:

said filter means comprises a three phase transformer having a three leg core to provide a third harmonic shunt; and wherein said filter means further comprises:

an inductor in series with the primary winding of each phase of said transformer; and a capacitor transformer coupled to all of said inductors to form parallel resonant third harmonic bandstop filter elements.

8. An electrical amplifying arrangement as claimed in claim 33 wherein said three phase transformer comprises:

a primary winding for each phase;

a center tap for each of said primary windings to divide each of said primary windings into two sections for push-pull operation; and center taps for each of said sections of each of said primary windings to provide said third supply voltages for said fifth and sixth transistors.

* * * * *